(12) United States Patent
Killeen et al.

(10) Patent No.: US 10,377,014 B2
(45) Date of Patent: Aug. 13, 2019

(54) INCREASED WETTING OF COLLOIDAL SILICA AS A POLISHING SLURRY

(71) Applicant: Ecolab USA Inc., St. Paul, MN (US)

(72) Inventors: Yvonne Marie Killeen, South St. Paul, MN (US); Amanda Ruth Blattner, Prior Lake, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/445,610

(22) Filed: Feb. 28, 2017

(65) Prior Publication Data

US 2018/0244532 A1    Aug. 30, 2018

(51) Int. Cl.
| | | |
|---|---|---|
| *C09K 3/14* | (2006.01) | |
| *B24B 37/04* | (2012.01) | |
| *C09G 1/02* | (2006.01) | |
| *B24B 37/24* | (2012.01) | |

(52) U.S. Cl.
CPC ............ *B24B 37/24* (2013.01); *B24B 37/044* (2013.01); *C09G 1/02* (2013.01); *C09K 3/1463* (2013.01)

(58) Field of Classification Search
None
See application file for complete search history.

(56) References Cited

U.S. PATENT DOCUMENTS

| | | | |
|---|---|---|---|
| 5,228,886 A | 7/1993 | Zipperian | |
| 5,407,526 A | 4/1995 | Danielson et al. | |
| 6,517,426 B2 | 2/2003 | Lee | |
| 6,719,819 B2 | 4/2004 | Ota et al. | |
| 6,786,945 B2 | 9/2004 | Machii et al. | |
| 6,910,952 B2 | 6/2005 | Suenaga et al. | |
| 7,695,347 B2 | 4/2010 | Masumura et al. | |
| 8,052,788 B2 | 11/2011 | MacDonald | |
| 8,702,472 B2 | 4/2014 | Morinaga et al. | |
| 8,721,917 B2 | 5/2014 | Cherian et al. | |
| 9,283,648 B2 | 3/2016 | Long et al. | |
| 2004/0132306 A1 | 7/2004 | Bellman et al. | |
| 2004/0147206 A1* | 7/2004 | Akahori | B24B 37/04 451/41 |
| 2005/0050803 A1 | 3/2005 | Amanokura et al. | |
| 2005/0227591 A1 | 10/2005 | Enomoto et al. | |
| 2005/0234136 A1 | 10/2005 | Holland et al. | |
| 2006/0196849 A1 | 9/2006 | Moeggenborg et al. | |

(Continued)

FOREIGN PATENT DOCUMENTS

| | | | |
|---|---|---|---|
| JP | 2009297818 A | | 12/2009 |
| JP | 2011162402 A | | 8/2011 |
| JP | 017008197 A | * | 1/2017 |

OTHER PUBLICATIONS

Bu, et al., "Selective Chemical Mechanical Polishing Using Surfactants", Journal of Electrochemical Society (2007) 154(7), pp. 631-635.

(Continued)

*Primary Examiner* — Shamim Ahmed
(74) *Attorney, Agent, or Firm* — McKee, Voorhees & Sease, PLC

(57) ABSTRACT

A method, kit, and composition for polishing a sapphire surface are described here. The invention involves a sapphire surface polishing composition comprising colloidal silica particles and an extended or gemini surfactant that can reduce the contact angles of the polishing composition on both polishing pads and sapphire surfaces.

18 Claims, 1 Drawing Sheet

(56) References Cited

U.S. PATENT DOCUMENTS

| | | |
|---|---|---|
| 2007/0116423 A1 | 5/2007 | Leatherdale et al. |
| 2008/0057716 A1 | 3/2008 | Yamashita |
| 2008/0283502 A1 | 11/2008 | Moeggenborg et al. |
| 2009/0018219 A1 | 1/2009 | Macdonald |
| 2009/0098807 A1 | 4/2009 | Bakshi et al. |
| 2009/0104851 A1 | 4/2009 | Cherian et al. |
| 2009/0314744 A1 | 12/2009 | Vacassy et al. |
| 2010/0159806 A1* | 6/2010 | Wu .................. B24D 3/346 451/28 |
| 2011/0223840 A1 | 9/2011 | Morinaga et al. |
| 2011/0258938 A1* | 10/2011 | Morinaga ............ B24D 3/00 51/309 |
| 2012/0129346 A1 | 5/2012 | Ryuzaki et al. |
| 2012/0270400 A1 | 10/2012 | Takegoshi et al. |
| 2013/0037515 A1 | 2/2013 | Hosoi et al. |
| 2013/0115859 A1 | 5/2013 | Choi et al. |
| 2013/0130595 A1 | 5/2013 | Yoshida |
| 2014/0001153 A1 | 1/2014 | Matsuyama et al. |
| 2014/0057532 A1 | 2/2014 | Long et al. |
| 2014/0057533 A1 | 2/2014 | Long et al. |
| 2014/0263170 A1 | 9/2014 | Long et al. |
| 2014/0335308 A1 | 11/2014 | Tanikella et al. |
| 2016/0189973 A1* | 6/2016 | Tabata .................. C09G 1/02 438/692 |
| 2017/0088748 A1* | 3/2017 | Stender ............ H01L 21/31053 |

OTHER PUBLICATIONS

Penta, et al., "Use of Anionic Surfactants for Selective Polishing of Silicon Dioxide Over Silicon Nitrade Films Using Colloidal Silica-Based Slurries", Applied Surface Science 283 (2013), pp. 986-992.

* cited by examiner

INCREASED WETTING OF COLLOIDAL SILICA AS A POLISHING SLURRY

FIELD OF THE INVENTION

The invention relates to methods, compositions, and kits for polishing sapphire surfaces using a polishing composition with improved wetting properties. In particular, the polishing composition comprises colloidal silica and a gemini or extended surfactant.

BACKGROUND OF THE INVENTION

Sapphire is a generic term for alumina ($Al_2O_3$) single-crystal materials. Sapphire is a particularly useful material for use as windows for infrared and microwave systems, optical transmission windows for ultraviolet to near infrared light, light emitting diodes (LED), ruby lasers, laser diodes, support materials for microelectronic integrated circuit applications and growth of superconducting compounds and gallium nitride, and the like. Sapphire has excellent chemical stability, optical transparency and desirable mechanical properties, such as chip resistance, durability, scratch resistance, radiation resistance, a good match for the coefficient of thermal expansion of gallium arsenide, and flexural strength at elevated temperatures. Sapphire wafers are commonly cut along a number of crystallographic axes, such as the C-plane (0001 orientation, also called the 0 degree plane or the basal plane), the A-plane (1120 orientation, also referred to as 90 degree sapphire) and the R-plane (1102 orientation, 57.6 degrees from the C-plane). R-plane sapphire, which is particularly suitable for silicon-on-sapphire materials used in semiconductor, microwave and pressure transducer applications, is more resistant to polishing than C-plane sapphire, which is typically used in optical systems, infrared detectors, and growth of gallium nitride for light-emitting diode applications.

The polishing and cutting of sapphire wafers can be an extremely slow and laborious process. Often, aggressive abrasives, such as diamond, must be used to achieve acceptable polishing rates. Such aggressive abrasive materials can impart serious sub-surface and surface damage and contamination to the wafer surface. Typical sapphire polishing involves continuously applying a slurry of abrasive to the surface of the sapphire wafer to be polished, and simultaneously polishing the resulting abrasive-coated surface with a rotating polishing pad, which is moved across the surface of the wafer, and held against the wafer surface by a constant down-force, typically in the range of about 5 to 20 pounds per square inch (psi). The interaction of sapphire and colloidal silica under the temperature and pressure of polishing pads leads to an energetically favorable chemical reaction for the formation of aluminum silicate dehydrate species (i.e., $Al_2O_3 + 2SiO_2 \rightarrow Al_2SiO_2 \cdot 2H_2O$). The hardness of these various hydrates and aluminum species are assumed to be lower than the underlying sapphire, resulting in a slight film, which can be easily removed by colloidal silica slurries without damaging the underlying surfaces. However, it takes a significant time to remove the hydrate coating, usually 18 to 20 hours. Prior practices have also focused on increasing polishing temperatures to increase the rate of alumina hydrate film formation and thus the removal rate.

An improved method for polishing sapphire surfaced using a colloidal silica composition is recently disclosed in U.S. Pat. No. 9,283,648 to Long, et. al., which is herein incorporated entirely by reference.

Even with the improved method of Long, the sapphire polishing performance is still slow. There is an ongoing need for compositions, kits and methods to enhance the efficiency of polishing of sapphire surfaces.

Accordingly, it is an objective of the claimed invention to develop an improved method and composition to increase the speed of polishing sapphire surfaces.

Other objects, advantages and features of the present invention will become apparent from the following specification taken in conjunction with the accompanying drawings.

BRIEF SUMMARY OF THE INVENTION

An advantage of the invention is that the polishing compositions have increased wetting with the sapphire surface. Increased wetting of the sapphire surface provides better surface area coverage of the sapphire with the polishing composition. Thus, a further advantage of the invention is that the speed of polishing sapphire surfaces is improved. It is an advantage of the present invention that by reducing the time necessary for polishing sapphire, the labor and cost to polishing the sapphire are also reduced.

In an embodiment, the present invention comprises a method of polishing a sapphire surface comprising abrading a a sapphire surface with a rotating polishing pad and a polishing composition, wherein the polishing composition comprises an effective amount of colloidal silica and a surfactant, the colloidal silica has a broad particle size distribution, and the surfactant is one represented by the following formula I or II,

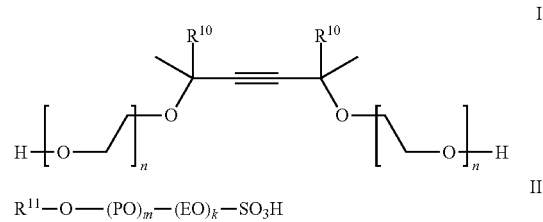

where $R^{10}$ is a $C_3$-$C_{20}$ alkyl or alkenyl group, $R^{11}$ is a $C_4$-$C_{20}$ alkyl, n, m, and k are independently integers of 1 to 20

In another embodiment, the present invention comprises a polishing composition for polishing a sapphire surface comprising colloidal silica having a particle size distribution of about 10 nm to about 120 nm and a surfactant represented by formula I or II,

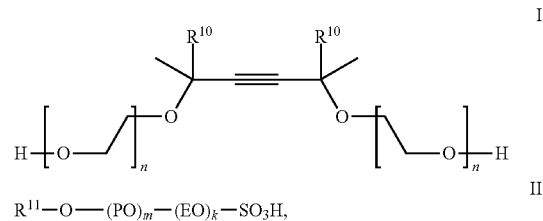

where $R^{10}$ is a $C_3$-$C_{20}$ alkyl or alkenyl group, $R^{11}$ is a $C_4$-$C_{20}$ alkyl, n, m, and k are independently integers of 1 to 20.

Another embodiment of the invention comprises a polishing kit for polishing a sapphire surface, the kit comprising a polishing pad comprising polyurethane impregnated with polyester, having a compressibility about 5% to about 10% and a Shore D hardness of about 50 to about 60, a colloidal silica having a particle size distribution of about 10 nm to about 120 nm and a surfactant, wherein the surfactant is from about 10 ppm to about 100 ppm in the composition and has a structure represented by the following formula I or II,

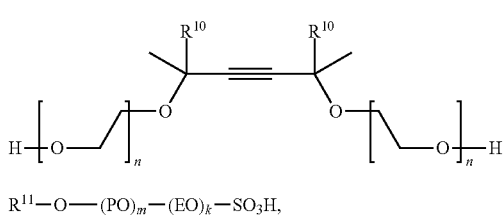

$$R^{11}-O-(PO)_m-(EO)_k-SO_3H,$$ II where $R^{10}$ is a $C_3$-$C_{20}$ alkyl or alkenyl group, $R^{11}$ is a $C_4$-$C_{20}$ alkyl, n, m, and k are independently integers of 1 to 20.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1A:
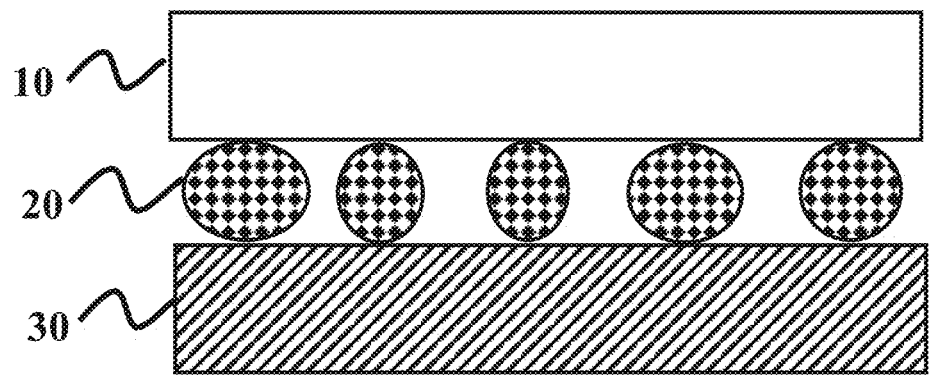
FIG. 1A shows an illustration of a polishing slurry composition with a high contact angle between a polishing pad and a sapphire surface.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to compositions and methods for polishing sapphire surfaces. The compositions and methods have many advantages over the existing ones. For example, the present composition and methods decrease the time necessary for polishing sapphire surfaces.

The embodiments of this invention are not limited to particular types of sapphire surfaces, e.g., C-plane, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, voltage, current, and electromagnetic field. Further, given solid and liquid handling procedures used in the real world, through inadvertent error in these procedures; through differences in the manufacture, source, or purity of the ingredients used to make the compositions or carry out the methods; through a statistical method to characterize a distribution, through an method or instrument in an industrial setting for measuring speed or evaluate a quantity of a product, or the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments alkenyl groups have from 2 to about carbon, or typically, from 2 to 10 carbone atoms. Alkenyl groups may be substituted or unsubstituted. Alkenyl groups may be substituted similarly to alkyl groups.

As used herein, the terms "alkylene", cycloalkylene", alkynylene, and alkenylene", alone or as part of another substituent, refer to a divalent radical derived from an alkyl, cycloalkyl, or alkenyl group, respectively, as exemplified by —$CH_2CH_2CH_2$—. For alkylene, cycloalkylene, alkynylene, and alkenylene groups, no orientation of the linking group is implied.

As used herein, "aryl" or "aromatic" groups are cyclic aromatic hydrocarbons that do not contains heteroatoms. Aryl groups include monocyclic, bicyclic, and polycyclic ring systems. Thus, aryl groups include, but are not limited to, phenyl, azulenyl, heptalenyl, biphenylenyl, indacenyl, florenyl, phenanthrenyl, triphenylenyl, pyrenyl, naphthacenyl, chrysenyl, biphenyl, anthracenyl, indenyl, indanyl, pentalenyl, and naphthyl groups. In some embodimets, aryl groups contain 6-14 carbons, in others from 6 to 12 or 6-10 carbon atoms in the ring portions of the groups. The phrase "aryl groups" includes groups containing fused rings, such as fused aromatic-aliphatic ring systems. Aryl groups may substituted or unsubstituted.

As used here, "Asker C" hardness means a measurement of the hardness of soft rubber and sponge, as measured by an Asker C hardness tester.

"Shore C hardness" is a measurement of the hardness of hard rubbers, semi-rigid plastics and hard plastics, as measured by a Shore durometer. The different Shore Hardness scales measure the resistance of a material to indentation by a needle under a defined spring force.

"Shore D hardness" is a measurement of the hardness of hard rubbers, semi-rigid plastics and hard plastics, as measured by a Shore durometer. The different Shore Hardness scales measure the resistance of a material to indentation by a needle under a defined spring force.

"Stable" means that the solid phase of the colloid is present, dispersed through the medium and stable throughout this entire pH range with effectively no precipitate.

The "Z-value" is a measurement of the vertical height at a given point on a surface, as determined by Atomic Force Microscopy. The "Z-range" is the difference in height between the maximum and minimum features in an image area.

As used herein, "Colloidal silica composition" and other like terms including "colloidal," "sol," and the like refer to an aqueous two-phase system having a dispersed phase and a continuous phase. The colloidal silica compositions used in the present invention have a solid phase dispersed or suspended in a continuous or substantially continuous liquid phase, typically an aqueous solution. Thus, the term "colloid" or "silica sol" encompasses both phases, whereas "colloidal particles," "colloidal silica," "silica sol particles" or "particles" refers to the dispersed or solid phase.

"Material Removal Rate" or "MRR" refers to the amount of the material removed divided by the time interval. The MRR may be reported in mass per unit time (e.g., mg/min), or in units of nm/min for a given substrate. For example, the density of sapphire is 3.98 g/$cm^3$, thus a 0.001 gram loss is equivalent to a 55.1 nm uniform loss across the surface of the 3 inch (7.62 cm) wafer. Therefore, material removal rate can be calculated by the following conversion equation:

MRR (nm/min)=(wt loss(g)×1000 mg/g×55.1 nm/mg)/polishing time (min)

"Polishing composition" as used herein refers to a composition that includes a colloidal silica composition, a surfactant, and optional additional components, which may be used for polishing a sapphire surface. The polishing composition may include colloidal silica as a dispersed phase, an aqueous solution as a continuous phase, and optionally additional components selected from alkaline substances, other inorganic polishing particles, water soluble alcohols, chelating agents, buffering agent, other surfactants, emulsifying agents, viscosity modifiers, wetting agents, lubricants, soaps, and the like.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Compositions and Kits for Polishing Sapphire Surfaces

Described herein are polishing compositions and kits comprising the polishing compositions, wherein the polishing composition comprises an extended or gemini surfactant and colloidal silica particles that have a broad, narrow, or uniform particle size distribution. The polishing composition may be an aqueous slurry of colloidal silica particles in water (e.g., deionized water), with optional additional components. Not to be bound by the theory, the extended or gemini surfactants in the polishing compositions at least function as dispersants for the colloidal silica particles. A benefit of the polishing compositions is that they can wet the sapphire surface.

Wetting is a property of a liquid to remain in contact with a solid surface. Wetting is composed of two forces, the adhesive forces which cause a liquid to spread on the surface and the cohesive force within the liquid which causes the liquid to ball together and avoid contact with the surface.

Wetting is described by the contact angle as the interface between the liquid and solid surface. If a surface is completely wet the contact angle would equal zero. Increased wetting makes the solid surface more hydrophilic and results in the liquid spreading across the solid surface thereby covering more surface area and in the case of a rough surface filling in the gaps and valleys (the Wenzel vs. the Cassie state). As part of the present invention, the liquid is the polishing slurry and if more of the slurry is in contact with the surface this can result in less polishing time. Thus, by providing compositions with a reduced contact angle will cover more of the surface area of the sapphire and reduce the polishing time for the sapphire surface.

Figure 1B:
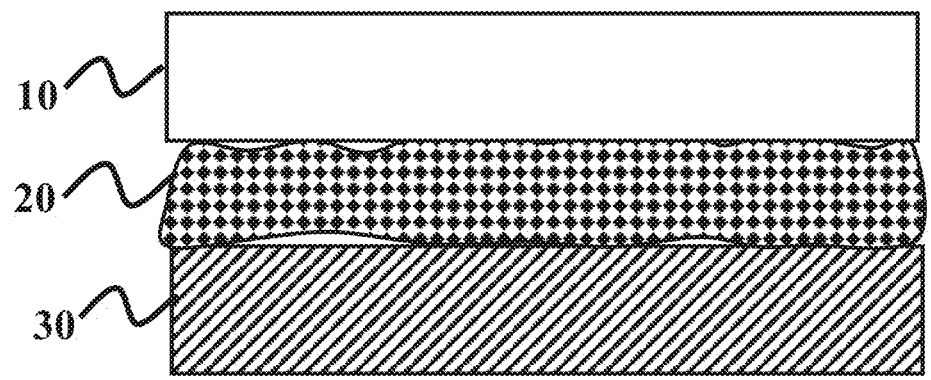
FIG. 1B shows an illustration of a polishing slurry composition with a low contact angle between a polishing pad and a sapphire surface.

FIGS. 1A and 1B provide an illustration of the this concept. FIG. 1A represents a polishing composition 20 having a higher contact angle, and thus poorer wetting properties. The surface area of the polishing composition 20 in contact with the polishing pad 10 and sapphire surface 30 is small. This is exemplary of existing polishing compositions, where the time necessary to polish a surface can often take 18 to 20 hours. FIG. 1B represents a polishing composition 20 having a lower contact angle, and thus improved wetting properties. The improved wetting properties cause more surface area of the polishing composition 20 to be in contact with the polishing pad 10 and sapphire surface 30. Thus, the time necessary for polishing can be reduced.

The kits further comprise a polishing pad for polishing a sapphire surface. The kit may be used to abrade a sapphire surface with the polishing pad and the polishing composition. The kit may be used to produce material removal rates (MRRs) greater than or comparable to those achieved using colloidal existing silica polishing compositions, for example, those having unimodal, tight particle size distributions (PSD) only. The kit may allow for use of lower concentrations of the polishing composition without loss in MRR. The kit may also further comprise instructions for polishing sapphire surfaces.

The kit may improve final surface roughness of a sapphire surface by providing a material removal rate (MRR) of at least about 30 nm/minute, 31 nm/minute, 32 nm/minute, 33 nm/minute, 34 nm/minute, 35 nm/minute, 36 nm/minute, 37 nm/minute, 38 nm/minute, 39 nm/minute, 40 nm/minute, 41 nm/minute, 42 nm/minute, 43 nm/minute, 44 nm/minute, 45 nm/minute, 46 nm/minute, 47 nm/minute, 48 nm/minute, 49 nm/minute, 50 nm/minute, 51 nm/minute, 52 nm/minute, 53 nm/minute, 54 nm/minute, 55 nm/minute, 56 nm/minute, 57 nm/minute, 58 nm/minute, 59 nm/minute, 60 nm/minute, 61 nm/minute, 62 nm/minute, 63 nm/minute, 64 nm/minute, 65 nm/minute, 66 nm/minute, 67 nm/minute, 68 nm/minute, 69 nm/minute, or 70 nm/minute, depending upon the pounds per square inch (PSI) pressure and the pad used on the sapphire surface.

The kit may achieve a material removal rate (MRR) from the sapphire surface of 40.0 nm/minute, 40.5 nm/minute, 41.0 nm/minute, 41.5 nm/minute, 42.0 nm/minute, 42.5 nm/minute, 43.0 nm/minute, 43.5 nm/minute, 44.0 nm/minute, 44.5 nm/minute, 45.0 nm/minute, 45.5 nm/minute, 46.0 nm/minute, 46.5 nm/minute, 47.0 nm/minute, 47.5 nm/minute, 48.0 nm/minute, 48.5 nm/minute, 49.0 nm/minute, 49.5 nm/minute, 50.0 nm/minute, 50.5 nm/minute, 51.0 nm/minute, 51.5 nm/minute, 52.0 nm/minute, 52.5 nm/minute, 53.0 nm/minute, 53.5 nm/minute, 54.0 nm/minute, 54.5 nm/minute, 55.0 nm/minute, 55.5 nm/minute, 56.0 nm/minute, 56.5 nm/minute, 57.0 nm/minute, 57.5 nm/minute, 58.0 nm/minute or 58.5 nm/minute removal rate from a sapphire surface.

The kit may provide a root mean square (RMS) roughness, or Rq, of a sapphire surface of less than or equal to 2.0 nm, 1.9 nm, 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm, 0.20 nm or 0.01 nm, from an initial RMS of up to 1 micron after polishing the sapphire surface for a period of time (e.g., about 180 minutes). The kit may achieve a RMS roughness of a sapphire surface of less than or equal to 5.0 A, 4.9 A, 4.8 A, 4.7 A, 4.6 A, 4.5 A, 4.4 A, 4.3 A, 4.2 A, 4.1 A, 4.0 A, 3.9 A, 3.8 A, 3.7 A, 3.6 A, 3.5 A, 3.4 A, 3.3 A, 3.2 A, 3.1 A, 3.0 A, 2.9 A, 2.8 A, 2.7 A, 2.6 A, 2.5 A, 2.4 A, 2.3 A, 2.2 A, 2.1 A, 2.0 A, 1.9 A, 1.8 A, 1.7 A, 1.6 A, or 1.5 A after polishing of the sapphire surface for a period of time (e.g., about 180 minutes).

The kit may provide a roughness average, or Ra, of a sapphire surface of equal to or less than 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm or 0.20 nm after polishing of the sapphire surface for a period of time (e.g., about 180 minutes). The kit may achieve a roughness average of a sapphire surface of 14.5 A, 4.4 A, 4.3 A, 4.2 A, 41 A, 4.0 A, 3.9 A, 3.8 A, 3.7 A, 3.6 A, 3.5 A, 3.4 A, 3.3 A, 3.2 A, 3.1 A, 3.0 A, 2.9 A, 2.8 A, 2.7 A, 2.6 A, 2.5 A, 2.4 A, 2.3 A, 2.2 A, 2.1 A, 2.0 A, 1.9 A, 1.8 A, 1.7 A, 1.6 A, or 1.5 A after polishing of the sapphire surface for a period of time (e.g., about 180 minutes).

The kit may also allow for effective polishing of a sapphire surface without significant increases in temperature during the polishing process. For example, the temperature may increase by less than 1, 2, 3, 4, 5, 6, 7, 8, 9 or 10° C. from the set temperature during the polishing.

Effective polishing of a sapphire surface can be further enhanced by elevating and controlling the temperature of the slurry and polishing platen to maintain temperatures above ambient temperature. For example, the polishing pad temperature may be targeted at 25° C. to 50° C.+/−3° C. during the polishing.

The process of particle dispersion is typically defined as the sum of three distinct processes: (a) wetting of dry particles to displace air from particle surface, (b) grinding to reduce solid aggregates to primary particles, and (c) stabilizing the dispersion to prevent particles from re-agglomerating.

The polishing compositions described here include an extended or gemini surfactant. Surfactants are of wide spread use in many diverse fields, such as cleaning, coating technologies, cosmetics, formulation of therapeutics, and formulation of crop protection agents. Their inherent ability to reduce the surface tension of a liquid is exploited to improve the spreading of liquids or solids over all kinds of surfaces. In pharmacological research membrane proteins represent an important set of drug targets. Here, detergents are used to extract the membrane proteins from the cell membrane and bring them in solution. Subsequent detergent removal in the presence of lipids after purification yields incorporation of membrane proteins into lipid vesicles which then can be used for biochemical investigations. Hence it is important to know the surfactant concentration in solution.

All surfactants have in common that they reduce the surface tension of any aqueous solution by partitioning to the air-water interface. This disturbs the ordered arrangement of water molecules at the surface and diminishes the force of attraction between them. The surface tension is steadily reduced upon increase of the surfactant concentration until the critical micellar concentration is reached, the concentration above which excess surfactant molecules start to form larger aggregates called micelles. Therefore, the concentration of free (monomeric) surfactant molecules in solution stays constant above the critical micellar concentration. The contact angle between a sitting drop and a solid support is defined by the Young's equation:

$$\cos \theta = (\gamma_{sv} - \gamma_{sl})/\gamma_{lv}$$

wherein $\delta_{sv}$, $\gamma_{sl}$ and $\gamma_{lv}$ are the interfacial tensions of the solid-vapor, solid-liquid and liquid-vapor interfaces respectively and θ is the Young contact angle. Thus the contact angle is related to the interfacial surface tensions and hence to the concentration of surfactants. An extended surfactant can greatly affect the contact angle of the liquid at the solid surface over a conventional surfactant. Extended surfactants because of their intermediate polarity group between the head and tail have increased solubility, lower critical micelle concentrations, lower interfacial tensions, and can have lower contact angles resulting in increased wettability.

Gemini surfactants, which have two hydrophobic tails and two hydrophilic head groups, have on the order of two times the surface activity of a conventional surfactant. Increasing the tail length and increasing the spacer leads to increased surface activity and decreased CMC and thus lower surface tension and increased wettability.

Extended Surfactants

A nonionic extended surfactant is used in the polishing compositions disclosed in this application. Extended surfactants usually include a linker polypropylene glycol link and have a general formula for a nonionic extended surfactant is R—[L]$_x$—[EO]$_y$—OH, where R is the lipophilic moiety, a linear or branched, saturated or unsaturated, substituted or unsubstituted, aliphatic or aromatic hydrocarbon radical having from about 8 to 20 carbon atoms, L is a linking group, such as propylene oxide, ethylene oxide, butylene oxide or a mixture thereof; EO is an ethylene oxide group, i.e. —OCH$_2$CH$_2$—, x is the chain length of the linking group ranging from 2-20; and y is the average degree of ethoxylation ranging from 1-5.

Anionic extended surfactants generally have a general formula of R—[L]$_x$—[EO]$_y$-M, where M is any ionic species such as carboxylates, sulfonates, sulfates, and phosphates. A cationic species will generally also be present for charge neutrality such as hydrogen, an alkali metal, alkaline earth metal, ammonium and ammonium ions which may be substituted with one or more organic groups.

More specifically, some anionic extended surfactants useful in this application include compounds represented by the formula:

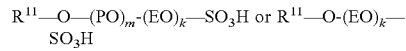
$R^{11}$—O—(PO)$_m$-(EO)$_k$—SO$_3$H or $R^{11}$—O—(EO)$_k$—SO$_3$H where $R^{11}$ is C$_4$-C$_{22}$ alkyl or alkenyl, m and k are numbers of from 0 to 100, k is preferably from about 0 to about 30 and m is preferably from about 0 to 10, wherein m plus k is at least one, and the EO and PO radicals can be randomly mixed or in discrete blocks.

Many extended chain anionic and nonionic surfactants are commercially available from a number of sources.

Gemini Surfactants

Some gemini surfactants are used in the polishing compositions of the invention. While conventional surfactants generally have one hydrophilic group and one hydrophobic group, a gemini surfactant has at least two hydrophobic groups and at least two hydrophilic groups. These surfactants have the general formula:

A-G-A$^1$ and get their name because they comprise two surfactant moieties (A, A$^1$) joined by a spacer (G), wherein each surfactant moiety (A, A$^1$) has a hydrophilic group and a hydrophobic group. Generally, the two surfactant moieties (A, A$^1$) are the same, but they can be different.

The gemini surfactants may be anionic, nonionic, cationic or amphoteric. The hydrophilic and hydrophobic groups of each surfactant moiety (A, A$^1$) may be any of those known to be used in conventional surfactants having one hydrophilic group and one hydrophobic group. For example, a typical nonionic gemini surfactant, e.g., a bis-polyoxyethylene alkyl ether, would contain two polyoxyethylene alkyl ether moieties. Each moiety would contain a hydrophilic group, e.g., polyethylene oxide, and a hydrophobic group, e.g., an alkyl chain.

Anionic and nonionic gemini surfactants include those of the formula:

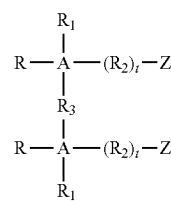

wherein R is independently $C_1$ to $C_{22}$ alkyl, $R_4C(O)$—, or $R_4$—B—$R_5$—, wherein $R_4$ is $C_1$ to $C_{22}$ alkyl, $R_5$ is $C_1$ to $C_{12}$ alkyl, and B is an amide group, —C(O)N($R_6$)—, an amino group —N($R_6$)—, a carboxyl group —C(O)—O—, a carbonyl group, or a polyether group -(EO)$_a$ (PO)$_b$—, wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO radicals can be randomly mixed or in discrete blocks, and $R_6$ is hydrogen or $C_1$ to $C_6$ alkyl.

$R_1$ is independently hydrogen or $C_1$ to $C_{22}$ alkyl; $R_2$ is independently a $C_1$-$C_{10}$ alkyl, —O—, an amide group —C(O)N($R_6$)—, a polyether group —O(EO)$_a$ (PO)$_b$—, —$R_7$-D-$R_7$—, or -D-$R_7$-D-, wherein $R_7$ is independently a $C_1$-$C_6$ alkyl and D is —O—, —S—, an amide group —C(O)N($R_6$)—, or an amino group —N($R_6$)—, wherein $R_6$, a and b are as defined above, and t is independently 0 or 1.

Z is independently hydrogen, —SO$_3$Y, —P(O)(OY)$_2$, —COOY, —CH$_2$COOY, —CH$_2$CH(OH)CH$_2$SO$_3$Y and when $R_2$ is not a polyether, Z is also —OSO$_3$Y, and —OPP(OY)$_2$; wherein Y is hydrogen, alkali metal such as sodium and potassium; alkaline earth metal such as magnesium and calcium; ammonium; or organic base salt such as monoethanolamine, diethanolamine, triethanolamine, triethylamine, trimethylamine, N-hydroxyethyl morpholine, and the like.

A is independently a straight chain or branched $C_1$ to $C_6$ alkyl, an O—$R_5$—O— group or aryl; preferably phenyl; $R_3$ is a bond, an aryl group such as a phenyl or diphenyl group, a $C_1$ to $C_{10}$ alkyl group, preferably a $C_1$ to $C_4$ alkyl group, most preferably methylene, —C≡C—, —O—, —S—, —S—S—, —N($R_6$)—, —$R_5$O—, —$R_5$O(EO)$_a$(PO)$_b$—, -$D_1$-$R_8$-$D_1$- or —$R_8$-$D_1$-$R_8$—, wherein $R_8$ is independently a $C_1$-$C_{10}$ alkyl group, —C(O)—, —$R_5$O(EO)$_a$(PO)$_b$—, —O—$R_5$—O—, or aryl, e.g. phenyl, and $D_1$ is independently —O—, —S—, —S—S—, —SO$_2$—, —C(O)—, a polyether group —O(EO)$_a$(PO)$_b$—, an amide group —C(O)N($R_6$)—, an amino group —N($R_6$)—, —O—$R_5$—O—, or aryl wherein $R_5$, $R_6$, a and b are as defined above.

On the formulae of this disclosure, the term "alkali" includes substituted alkali, especially the hydroxy substituted derivatives thereof and straight as well as branched chains. When Z is hydrogen, the gemini surfactants are nonionic.

Other gemini surfactants specifically useful in the present invention include gemini anionic or nonionic surfactants of the formulae:

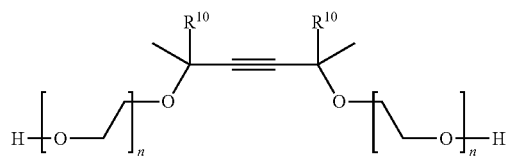

wherein $R_c$ represents aryl, preferably phenyl. $R_1$, $R_3$, $R_4$, and Z are as defined above. a and b are numbers of from 0 to 100, a is preferably from about 0 to about 30 and b is preferably from about 0 to 10, wherein a plus b is at least one, and the EO and PO radicals can be randomly mixed or in discrete blocks.

More specifically, useful gemini surfactants in this application include compounds represented by the formula:

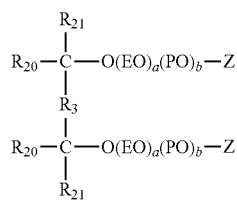

wherein $R_3$ is a —C≡C— group, $R_{20}$ is methyl, $R_{21}$ is a $C_1$-$C_{22}$ alkyl or $C_2$-$C_{22}$ alkenyl group, and Z is a hydrogen.

Even more specifically, useful gemini surfactants in this application include compounds represented by the formula:

wherein $R^{10}$ is a $C_1$-$C_{22}$ alkyl or $C_2$-$C_{22}$ alkenyl group. n is numbers of from 0 to 100, a is preferably from about 0 to about 30 and n is preferably from about 1 to 10.

The primary hydroxyl group of these surfactants can be readily phosphated, sulfated or carboxylated by standard techniques.

Many gemini surfactants are commercially available from a number of sources. For example, gemini surfactants can be obtained from Air Products, Dow, Hampshire Chemical Corp., and Sasol.

Colloidal Silica

The colloidal silica may be a suspension of fine amorphous, nonporous, and typically spherical silica (SiO$_2$) particles in a liquid phase. The colloidal silica particles may have a particle size distribution of about 5 nm to about 120 nm. The colloidal silica particles may have a particle diameter of about 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 105 nm, 110 nm, 115 nm, and 120 nm with each colloid silica particle size representing about 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, 20.0%, 20.5%, 21.0%, 21.5%, 22.0%, 22.5%, 23.0%, 23.5%, 24.0%, 24.5%, or 25.0% of the total mass of the colloidal silica particles used in the polishing composition. Such colloidal silica particles are described in U.S. Pat. No. 9,283,648.

In embodiments, the particle size distribution of colloidal silica compositions can be defined by the ratio of the standard deviation of the distribution, σ, to the average particle diameter, r, as determined using transmission electron microscopy (TEM). Such a convention is described in U.S. Pat. No. 6,910,952. Colloidal silica compositions that may be used in the methods and kits described herein may have a may have abroad particle size distribution, with values of air of at least about 0.30 to about 0.90, e.g., about 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.7, 0.73, 0.74, 0.75, 0.76, 0.77. 0.78, 0.79, 0.80, 0.81, 0.82, 0.83, 0.84, 0.85, 0.86, 0.87, 0.88, 0.89 or 0.90.

The colloidal silica particles may have a mean particle diameter, r, of about 10 nm to about 50 nm, e.g., about 20 nm to about 40 nm. For example, the colloidal silica particles may have a mean particle size of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm.

The standard deviation of the particle size distribution of the colloidal silica particles, $\sigma$, of about 10 to about 20, e.g., about 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9 or 20.

The percent of total mass of each colloidal silica particle at a particular size may vary greatly, but a broad distribution of sizes is present. For example, the colloidal silica composition may have a mean particle size of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm, and particles of each size may be about 0.5%, 1.0%, 1.5%, 2.0%, 2.5%, 3.0%, 3.5%, 4.0%, 4.5%, 5.0%, 5.5%, 6.0%, 6.5%, 7.0%, 7.5%, 8.0%, 8.5%, 9.0%, 9.5%, 10.0%, 10.5%, 11.0%, 11.5%, 12.0%, 12.5%, 13.0%, 13.5%, 14.0%, 14.5%, 15.0%, 15.5%, 16.0%, 16.5%, 17.0%, 17.5%, 18.0%, 18.5%, 19.0%, 19.5%, or 20.0% of the total mass of the colloidal silica particles used in the polishing composition.

Liquid Phase

The polishing composition further comprises a liquid phase in order to generate a slurry. For example, the liquid phase may be deionized water. Either prior to or following formation of the slurry of colloidal silica in the liquid phase, the pH may be adjusted to between about 6 and about 11, between about 7 and about 10, between about 6 and about 7, between about 7 to about 8, between about 8 and about 9, between about 9 and about 10, between 10 and about 11, or about 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4 or 10.5. The pH may be adjusted using a base such as sodium hydroxide, potassium hydroxide, or the like.

Optional Additional Components

In embodiments, the polishing composition may further include one or more of the following additives:

A) Alkaline substances,

B) Inorganic polishing particles such as non-oxide sols, including diamond, boron nitride, silicon nitride, silicon carbide, etc. Similarly, alumina, zirconia, zirconium silicate, mullite, cerium oxide, iron oxide, chromium oxide, titanium oxide, tin oxide and the like can be added. Similarly, the composition may contain hydrated oxides such as aluminum hydroxide, boehmite, or goethite.

C) Water-soluble alcohols such as ethanol, propanol, ethylene glycol, propylene glycol, and the like.

D) Chelating agents,

E) Buffering agents. Buffered compositions can be adjusted to span the pH range from near-neutral to basic. Mono, di and polyprotic acids may act as buffers, and when fully or partially de-protonated with bases such as ammonium hydroxide. Ammonium salts of the acids are suitable, but other alkali and alkaline earth metal salts of the carboxylic acids may be used. Representative examples include salts of carboxylic acids include, for example, mono-carboxylic acids, di-carboxylic acids, tri-carboxylic acids, and poly-carboxylic acids. Specific compounds include, for example, malonic acid, oxalic acid, citric acid, tartaric acid, succinic acid, malic acid, adipic acid, salts thereof, and mixtures thereof. Nitrogen containing compounds that may buffer the slurry include: aspartic acid, glutamic acid, histidine, lysine, arginine, omithine, cysteine, tyrosine, and camosine, bis(2-hydroxyethyl)iminotris(hydroxymethyl) methane, tris(hydroxymethyl)aminomethane, N-(2-acetamido)-2-iminodiacetic acid, 1,3-bis[tris(hydroxymethyl) methylamino]propane, triethanolamine, N-tris (hydroxymethyl)methylglycine, N,N-bis(2-hydroxyethyl) glycine, and glycine. Ammonium hydrogen phosphate may also be used in the slurry.

F) Other surfactants, emulsifying agents, viscosity modifiers, wetting agents, lubricants, soaps, and the like. Typical other surfactants include non-ionic, anionic, cationic, zwitterionic, amphoteric and polyelectrolyte compounds. Examples include organic acids, alkane sulfates, alkaline sulfonates, hydroxides, substituted amine salts, betaines, polyethylene oxide, polyvinyl alcohol, polyvinyl acetate, polyacrylic acid, polyvinyl pyrrolidone, polyethyleneimine, sodium alkylbenzenesulfonatem tetramethyl ammonium halides, cetyl trimethyl ammonium halides, nonyl ethers, and combinations thereof.

Alkalinity Source

In some embodiments of the invention, the composition itself, or composition of the method and kit includes an alkalinity source. In some embodiments of the invention, the composition itself, or the composition of the method or kit can be substantially free of hydroxide-based alkalinity sources.

The alkalinity source can include hydroxide-based alkalinity sources. Suitable alkalinity sources for use in the invention can also include alkanol amines, carbonates, hydroxides, and silicates.

Suitable alkanolamines include triethanolamine, monoethanolamine, diethanolamine, and mixtures thereof. Suitable carbonates include alkali metal carbonates, such as sodium carbonate, potassium carbonate, bicarbonate, sesquicarbonate, and mixtures thereof. Suitable hydroxides include alkali and/or alkaline earth metal hydroxides. Preferably, a hydroxide-based alkalinity source is sodium hydroxide. Suitable silicates include metasilicates, sesquisilicates, orthosilicates, and mixtures thereof.

Chelating Agents/Water Conditioning Agents

Chelation herein means the binding or complexation of a bi- or multidentate ligand. These ligands, which are often organic compounds, are called chelants, chelators, chelating agents, and/or water conditioning agent. Chelating agents form multiple bonds with a single metal ion. Chelants, are chemicals that form soluble, complex molecules with certain metal ions, inactivating the ions so that they cannot normally react with other elements or ions to produce precipitates or scale. The ligand forms a chelate complex with the substrate. The term is reserved for complexes in which the metal ion is bound to two or more atoms of the chelant. The chelants for use in the present invention are those having crystal growth inhibition properties, i.e. those that interact with the small calcium and magnesium carbonate particles preventing them from aggregating into hard scale deposit. The particles repel each other and remain suspended in the water or form loose aggregates which may settle. These loose aggregates are easily rinse away and do not form a deposit.

Suitable chelating agents can be selected from the group consisting of amino carboxylates, amino phosphonates, polyfunctionally-substituted aromatic chelating agents and mixtures thereof. Preferred chelants for use herein are weak chelants such as the amino acids based chelants and preferably citrate, citrate, tararate, and glutamic-N,Ndiacetic acid and derivatives and/or phosphonate based chelants. A preferable chelating agent may be one or more amine or amide containing chelants, such as ethylenediaminetetraacetic acid, ethyldiamine and methylformamide and organic acids, such as oxalic acid or iminodiacetic acid.

Amino carboxylates include ethylenediaminetetra-acetates, N-hydroxyethylethylenediaminetriacetates, nitrilotriacetates, ethylenediamine tetraproprionates, triethylenetetraaminehexacetates, diethylenetriaminepentaacetates, and ethanoldi-glycines, alkali metal, ammonium, and substituted ammonium salts therein and mixtures therein. As well as MGDA (methyl-glycine-diacetic acid), and salts and derivatives thereof and GLDA (glutamic-N,N-diacetic acid) and salts and derivatives thereof. GLDA (salts and derivatives thereof) is especially preferred according to the invention, with the tetrasodium salt thereof being especially preferred.

Other suitable chelants include amino acid based compound or a succinate based compound. The term "succinate based compound" and "succinic acid based compound" are used interchangeably herein. Other suitable chelants are described in U.S. Pat. No. 6,426,229. Particular suitable chelants include; for example, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl)aspartic acid (SMAS), N-(2-sulfoethyl)aspartic acid (SEAS), N-(2-sulfomethyl)glutamic acid (SMGL), N-(2-sulfoethyl)glutamic acid (SEGL), Nmethyliminodiacetic acid (MIDA), .quadrature.-alanine-N,N-diacetic acid (.quadrature.-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof. Also suitable is ethylenediamine disuccinate ("EDDS"), especially the [S,S] isomer as described in U.S. Pat. No. 4,704,233. Furthermore, Hydroxyethyleneiminodiacetic acid, Hydroxyiminodisuccinic acid, Hydroxyethylene diaminetriacetic acid is also suitable.

Other chelants include homopolymers and copolymers of polycarboxylic acids and their partially or completely neutralized salts, monomeric polycarboxylic acids and hydroxycarboxylic acids and their salts. Preferred salts of the above-mentioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulfonates.

Amino phosphonates are also suitable for use as chelating agents and include ethylenediaminetetrakis(methylenephosphonates) as DEQUEST. Preferred, these amino phosphonates that do not contain alkyl or alkenyl groups with more than about 6 carbon atoms.

Polyfunctionally-substituted aromatic chelating agents are also useful in the compositions herein such as described in U.S. Pat. No. 3,812,044. Preferred compounds of this type in acid form are dihydroxydisulfobenzenes such as 1,2-dihydroxy-3,5-disulfo benzene.

Further suitable polycarboxylates chelants for use herein include citric acid, lactic acid, acetic acid, succinic acid, formic acid all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Polishing Pads

The kit may further comprise a polishing pad to be used in conjunction with the polishing composition to treat the sapphire surface. The polishing pad may comprise a resin, or a woven or non-woven material. For example, the polishing pad may include a polyurethane pad or a polyurethane impregnated fiber-based material, such as a polyester felt or suede.

The polishing pad may have a compressibility of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5% or 40%.

The polishing pad may have a Shore C hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have a Shore D hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have an Asker C hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

The polishing pad may have a JIS hardness of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100.

Suitable pads are available under the trade name SUBA™ from Rohm & Haas. For example, a SUBA™ 500 pad has a relatively low compressibility (about 13%) and a Shore D hardness of about 55. A SUBA™ 600 pad has a compressibility of about 4% and an Asker C hardness of about 80. A SUBA™ 800 pad has a compressibility of about 4% and an Asker C hardness of about 82. Additionally, MHN and MHS pads, available through Rohm & Haas, are a polyurethane pads with very low compressibility (about 3%) and a Japanese Industrial Standard (JIS) hardness of about 84.

Other Elements

A kit may further comprise additional elements. For example, a kit may also include instructions for use of the polishing composition and/or the polishing pad. Instructions included in kits can be affixed to packaging material or can be included as a package insert. While the instructions are typically written or printed materials they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD, DVD), and the like. As used herein, the term "instructions" can include the address of an internet site that provides the instructions. The various components of the kit optionally are provided in suitable containers as necessary, e.g., a bottle, jar or vial.

Methods of Polishing Sapphire Surfaces

Disclosed herein are also methods for polishing sapphire surfaces using the kit as described above or a composition comprising colloidal silica particles having a broad particle size distribution. The method comprises abrading a sapphire surface with a rotating polishing pad and a polishing composition, wherein the polishing composition comprises an effective amount of colloidal silica, and wherein the colloidal silica has a broad particle size distribution.

For example, the methods disclosed herein may involve chemical mechanical polishing (CMP). The main objectives of CMP are to smooth surface topography of dielectric deposits to enable multilevel metallization, or to remove excess coating material to produce inlaid metal damascene structures and shallow isolation trenches. While the mechanisms of material removal in CMP are not completely understood, in general the oxide substrates can be chemically treated at the surface to quickly create a more brittle or softer thin film. This surface film is then "gently" abraded to a uniform planarity using formulations containing both chemical and abrasive components.

In the methods of the invention, the polishing composition may be applied to a surface of a sapphire surface, such as a wafer, mounted in a rotating carrier. The sapphire surface may then be abraded using a rotating polishing pad. Typically, at least a portion of the polishing slurry remains disposed between the polishing surface of the pad and the surface of the sapphire surface during the process. The polishing pad has a planar polishing surface that rotates about an axis of rotation perpendicular to the sapphire surface at a selected rotation rate. The rotating polishing surface of the pad is pressed against the sapphire surface with a selected level of down-force perpendicular to the sapphire surface. The polishing composition may be applied to the sapphire surface by continuously supplying the slurry onto the sapphire surface while the rotating polishing pad is pressed against the sapphire surface.

The combined action of the rotating polishing pad and polishing slurry may remove sapphire from the surface at a rate that is greater than the sapphire removal rate achievable by abrading the sapphire surface with the same pad, at the same rate of rotation, and the same down-force, using a polishing composition having colloidal silica particles of a narrow size distribution.

The polishing pad may be pressed against the sapphire surface with a down-force of about 5 psi to about 25 psi, e.g., about 10 psi to about 20 psi, or about 12 psi to about 16 psi. For example, the pad may be applied to the sapphire surface with a down-force of about 5, 6, 7, 8, 9, 10, 11, 12, 13, 14, 15, 16, 17, 18, 19, 20, 21, 22, 23, 24 or 25 psi. The polishing pad may be rotated at a rate of about 40 to about 120 revolutions per minute (rpm), or about 60 to 80 rpm. For example, the polishing pad may be rotated at a rate of about 40, 45, 50, 55, 60, 65, 70, 75, 80, 85, 90, 95, 100, 105, 110, 115 or 120 rpm.

In the methods, the sapphire surface may be polished for from about 60 to about 250 min, from about 90 to about 225, from about 120 to about 200 min, from about 150 to about 175 min, about 120 min, 125 min, 130 min, 140 min, 145 min, 150 min, 155 min, 160 min, 165 min, 170 min, 175 min, 180 min, 185 min, 190 min, 195 min, 200 min, 205 min, 210 min, 215 min, 220 min or 225 min.

The methods may be useful for polishing or planarizing a C-plane or R-plane surface of a sapphire wafer, and may provide material removal rates that are significantly higher than those achieved with conventional abrasive slurries, such as those having narrow particle size distributions. Removal rates may be at least about 10%, 15%, 20%, 25%, 30%, 35%, 40%, 45%, 50%, 55%, 60%, 65%, 70%, 75%, 80%, 85% or 90% higher the removal rate obtainable with a slurry having a narrow particle size distribution.

The methods can be carried out utilizing any abrasive polishing equipment. Suitably, the polishing is accomplished with sapphire wafers mounted in a rotating carrier, using a rotating polishing pad applied to the surface of the wafers at a selected down-force (e.g., with a down-force in the range of about 2 to about 20 psi) at a selected pad rotation rate (e.g., about 20 to about 150 rpm), with the wafers mounted on a carrier rotating at a selected rotation rate (e.g., about 20 to about 150 rpm). Suitable polishing equipment is commercially available from a variety of sources, such as CETR (Campbell, Calif.) and SpeedFam (Kanagawa, Japan). For example, a CP-4 CMP testing instrument or a SpeedFam GPAW32 instrument may be used.

The method may improve final surface roughness of a sapphire surface by providing a material removal rate (MRR) of at least about 30 nm/minute, 31 nm/minute, 32 nm/minute, 33 nm/minute, 34 nm/minute, 35 nm/minute, 36 nm/minute, 37 nm/minute, 38 nm/minute, 39 nm/minute, 40 nm/minute, 41 nm/minute, 42 nm/minute, 43 nm/minute, 44 nm/minute, 45 nm/minute, 46 nm/minute, 47 nm/minute, 48 nm/minute, 49 nm/minute, 50 nm/minute, 51 nm/minute, 52 nm/minute, 53 nm/minute, 54 nm/minute, 55 nm/minute, 56 nm/minute, 57 nm/minute, 58 nm/minute, 59 nm/minute, 60 nm/minute, 61 nm/minute, 62 nm/minute, 63 nm/minute, 64 nm/minute, 65 nm/minute, 66 nm/minute, 67 nm/minute, 68 nm/minute, 69 nm/minute, or 70 nm/minute, depending upon the pounds per square inch (PSI) pressure and the pad used on the sapphire surface. The method may achieve a material removal rate (MRR) from the sapphire surface of about 40.0 nm/minute, 40.5 nm/minute, 41.0 nm/minute, 41.5 nm/minute, 42.0 nm/minute, 42.5 nm/minute, 43.0 nm/minute, 43.5 nm/minute, 44.0 nm/minute, 44.5 nm/minute, 45.0 nm/minute, 45.5 nm/minute, 46.0 nm/minute, 46.5 nm/minute, 47.0 nm/minute, 47.5 nm/minute, 48.0 nm/minute, 48.5 nm/minute, 49.0 nm/minute, 49.5 nm/minute, 50.0 nm/minute, 50.5 nm/minute, 51.0 nm/minute, 51.5 nm/minute, 52.0 nm/minute, 52.5 nm/minute, 53.0 nm/minute, 53.5 nm/minute, 54.0 nm/minute, 54.5 nm/minute, 55.0 nm/minute, 55.5 nm/minute, 56.0 nm/minute, 56.5 nm/minute, 57.0 nm/minute, 57.5 nm/minute, 58.0 nm/minute or 58.5 nm/minute removal rate from a sapphire surface.

The method may provide a root mean square (RMS) roughness, or Rq, of a sapphire surface of less than or equal to about 2.0 nm, 1.9 nm, 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm, 0.20 nm or 0.10 nm, from an initial RMS of up to 1 micron after polishing the sapphire surface for a period of time (e.g., about 180 minutes). The kit may achieve a RMS roughness of a sapphire surface of less than or equal to about 5.0 Å, 4.9 Å, 4.8 Å, 4.7 Å, 4.6 Å, 4.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes).

The method may provide a roughness average, or Ra, of a sapphire surface of equal to or less than about 1.8 nm, 1.7 nm, 1.6 nm, 1.5 nm, 1.4 nm, 1.3 nm, 1.2 nm, 1.1 nm, 1.0 nm, 0.9 nm, 0.80 nm, 0.70 nm, 0.60 nm, 0.50 nm, 0.40 nm, 0.30 nm or 0.20 nm after polishing of the sapphire surface for a period of time (e.g., about 180 minutes). The kit may achieve a roughness average of a sapphire surface of about 4.5 Å, 4.4 Å, 4.3 Å, 4.2 Å, 4.1 Å, 4.0 Å, 3.9 Å, 3.8 Å, 3.7 Å, 3.6 Å, 3.5 Å, 3.4 Å, 3.3 Å, 3.2 Å, 3.1 Å, 3.0 Å, 2.9 Å, 2.8 Å, 2.7 Å, 2.6 Å, 2.5 Å, 2.4 Å, 2.3 Å, 2.2 Å, 2.1 Å, 2.0 Å, 1.9 Å, 1.8 Å, 1.7 Å, 1.6 Å, or 1.5 Å after polishing of the sapphire surface for a period of time (e.g., about 180 minutes).

The method may also allow for effective polishing of a sapphire surface without significant increases in temperature during the polishing process. For example, the temperature may increase by less than about 0.1, 0.2, 0.3, 0.4, 0.5, 0.6, 0.7, 0.8, 0.9, 1, 2, 3, 4, 5, 6, 7, 8, 9 or 10° C. during the polishing.

The Coefficient of Friction (CoF) may be monitored over the course of a polish time (e.g., a polish time described herein, such as 180 min). Such monitoring may indicate that the CoF increases by about 0.05, 0.10, 0.15, 0.20, 0.25, 0.30, 0.35, 0.40, 0.45 or 0.50 over the course of the polish time.

Surfactants

In some embodiments, the compositions of the present invention include a surfactant. Surfactants suitable for use with the compositions of the present invention include, but are not limited to, nonionic surfactants, anionic surfactants, and zwitterionic surfactants. In some embodiments, the compositions of the present invention include about 10 wt % to about 50 wt % of a surfactant. In other embodiments the compositions of the present invention include about 15 wt % to about 30 wt % of a surfactant. In still yet other embodiments, the compositions of the present invention include about 25 wt % of a surfactant. In some embodiments, the compositions of the present invention include about between 50 ppm and about 5000 ppm of a surfactant, preferably greater than about 100 ppm, more preferably greater than about 300 ppm, most preferably between about 500 ppm and about 3000 ppm.

In an aspect of the invention, the surfactant and/or polishing composition can have a contact angle on the surface of the sapphire of less than about 70 degrees at 30 seconds, preferably less than about 50 degrees at 30 seconds, more preferably less than about 30 degrees at 30 seconds, still more preferably less than about 25 degrees at 30 seconds, and most preferably less than about 20 degrees at 30 seconds.

In an aspect of the invention, the surfactant and/or polishing composition can have a surface tension of less than the critical surface tension of the sapphire surface at 20° C. Preferably, the surfactant and/or polishing composition has a surface tension of less than 45 dyne/cm at 20° C., more preferably less than about 35 dyne/cm at 20° C., and most preferably less than about 30 dyne/cm at 20° C.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available from BASF Corp. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of Nonionic Low Foaming Surfactants Include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional Examples of Effective Low Foaming Nonionics Include:

7. The alkylphenoxypolyethoxyalkanols of U.S. Pat. No. 2,903,486 issued Sep. 8, 1959 to Brown et al. and represented by the formula

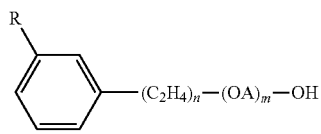

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n (C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n (C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}-(PO)_sN-(EO)_tH$, $R^{20}-(PO)_sN-(EO)_tH(EO)_tH$, and $R^{20}-N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)_v-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

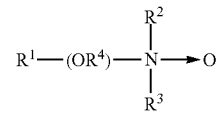

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R_1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

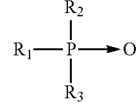

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

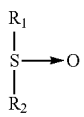

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, isododecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$); and capped alcohol alkoxylates, such as Plurafac LF221 and Tegoten EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

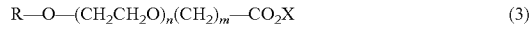

(3)

in which R is a $C_8$ to $C_{22}$ alkyl group or

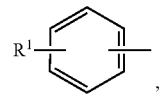

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

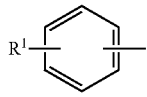

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

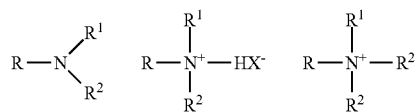

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1{}_m R^2{}_x Y_L Z$ wherein each $R^1$ is an organic group containing a straight or branched alkyl or alkenyl group optionally substituted with up to three phenyl or hydroxy groups and optionally interrupted by up to four of the following structures:

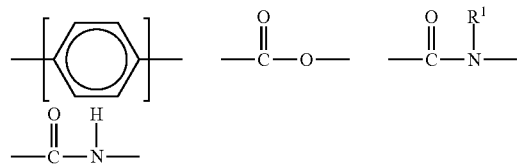

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens.

Y is can be a group including, but not limited to:

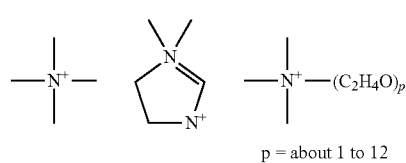

p = about 1 to 12

-continued

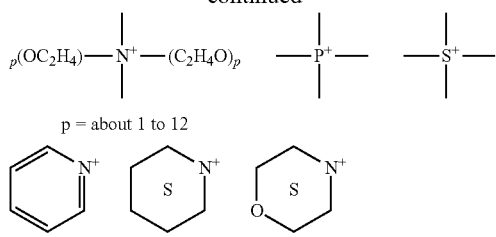

p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

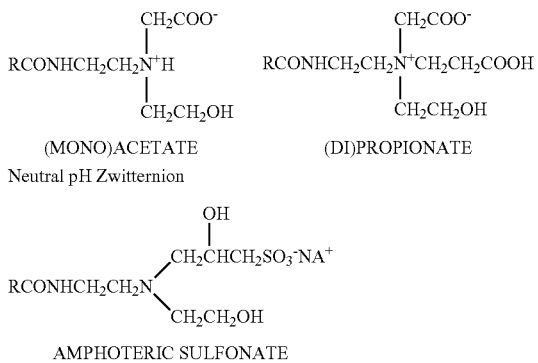

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Coco-amphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

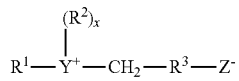

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

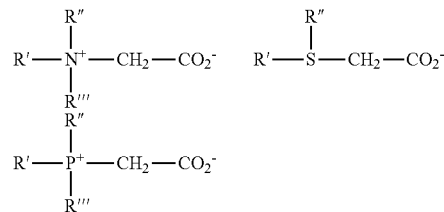

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following materials are used in the Examples:

Acusol™ 820—a hydrophobically modified alkali soluble acrylic polymer emulsion with unusually high aqueous thickening and stabilizing efficiency;

Acusol™ 445N—45% active polyacrylic acid (4500MW);

Glucopon APG 425 N, 50%—an alkypolyglucoside non-ionic surfactant from Cognis;

APG RD 200818, 50%—an alkypolyglucoside non-ionic surfactant from BASF;

APG 200609, 50%—an alkypolyglucoside non-ionic surfactant from BASF;

Dow 500W Additive, 70-90%—a silicone wetting agent from Dow;

Dow 501W Additive, 70-90%—a silicone wetting agent from Dow;

Dow 502W Additive, 70-90%—a silicone wetting agent from Dow;

Dow 67W Additive, 70-90%—a silicone wetting agent from Dow;

Dynol™ 604—"Gemini" surfactant available from Air Products;

Dynol™ 607—"Gemini" surfactant available from Air Products;

Dynol™ 800—"Gemini" surfactant available from Air Products;

Dynol™ 960—"Gemini" surfactant available from Air Products;

Dynol™ 980—"Gemini" surfactant available from Air Products;

EnviroGem® 360, 95%—"Gemini" surfactant available from Air Products;

EnviroGem® AD01—"Gemini" surfactant available from Air Products;

TX-15717—Colloidal silica by Nalco, pH 2.6 and 30%-60% silica;

Nalco 2325—Colloidal silica by Nalco, pH 9.5, a broad distribution of particles of 10 nm-100 nm in size, and 40%-50% silica;

TX-15763—Colloidal silica by Nalco, pH 2.97, a large particle, and 30%-50% silica;

LAE 24-7—a linear alcohol ethoxylate;

X-AES—an $C_{12-14}$—$(PO)_{16}(EO)_2$-Sulfate anionic surfactant from Huntsman;

CTAB—cetyltrimethyl ammonium bromide, a quaternary ammonium surfactant available from multiple commercial sources;

Lutensol XP-50—a non-ionic ethoxylated Guerbet alcohol;

Colatrope INC—a sodium alkanoate surfactant/hydrotrope from Colonial Chemical;

Ecosurf EH-6—a (PO)m(EO)n series nonionic surfactant, from Dow;

FDRA, 24%—a rinse additive product from Ecolab;

Finito, 7.32% surf, a pesticide product from Ecolab;

Surfynol 420—an Ethoxylated acetylenic diol non-ionic wetting agent from Air Products;

Rhodafac RS410, 98%—an organic phosphate ester from Rhodia;

Various extended guerbet alcohols having 8PO/8EO—Non-ionic surfactants from Nalco;

Tegopren 6950—Polysiloxane betaine from Evonik;

Tegopren 5840, 75%—a polyether siloxane from Evonik;

Tegopren 5843—a polyether siloxane from Evonik;

Tegopren 5852—a polyether siloxane from Evonik;

Plurafac LF-221—alcohol, C13-16 branched and linear butyoxylated and ethoxylated, non-ionic from BASF;

PEA-25—alcohol, C12-16 alkylether, propoxylated, ethoxylated non-ionic from Huntsman;

Plurafac SL-62—nonionic surfactant available from BASF, $C_6$-$C_{10}$—$(PO)_3(EO)_8$;

Plurafac SL-42—nonionic surfactant available from BASF, $C_6$-$C_{10}$—$(PO)_3(EO)_6$;

Tetronic 701—Ethylene diamine, ethoxylated and propoxylated from BASF;

Tetronic 90R4—an alkoxylated diamine from BASF;

Silwet L-77—a polyalkyleneoxide modified heptamethyltrisiloxane from Momentive;

Marlowet 4539, 90%—nonionic surfactant, Sasol, iso $C_9$—$(PO)_2(EO)_2$ carboxylic acid;

Alfoterra 123-8S, 90%—nonionic surfactant, Huntsman, $C_{12}$-$C_{13}$—$(PO)_8$-Sulfate; and Lutensol XL-70—nonionic surfactant, BASF, $C_{10}$—$(PO)_a(EO)_b$ series.

Example 1

Colloidal silica compositions disclosed in Table 1 were placed on three different microfiber pads and contact angle was measured according to the following procedure. The solution of the desired concentration is prepared and approximately 2-3 mL of the solution is placed in 10 mL syringe. The syringe is then placed into a contact angle measurement apparatus equipped with data collection software. The test substrate, i.e., a microfiber cloth, is then placed on the substrate holder in view of the apparatus' camera which captures the delivery of the drop from the syringe to the test substrate. A single drop is then dispensed and contact angle is measured via the camera capture and software. Contact angle data for each of the microfiber clothes are shown in Table 2.

The control colloidal silica composition is one with LAE 24-7 and has a 30 second contact angle of 59.45 degrees. Dynol 960, Dynol 980, Dynol 800, Dynol 810, Dynol 604, X-AES, Dynol 604, Dynol 607, and Alfoterra 123-8S were the surfactants that reduced the contact angle of colloidal silica to less than 41 degrees.

Just as on the previous pad, Dynols 960, Dynol 810, Dynol 980, Dynol 800, Dynol 604, X-AES, Lutensol XL-70, and Dynol 607 show a contact angle less than colloidal silica alone and one with LAE 24-7 on this least hydrophobic pad.

TABLE 1

Various Polishing Compositions

| Component | Nalco 2325 | TX15763 | 1 | 2 | 3 | 4 | 5 | 6 |
|---|---|---|---|---|---|---|---|---|
| CTAB | | | | 0.0051 | | | | |
| APG 425 | | | | | 0.0052 | | | |
| XP-50 | | | 0.005 | | | 0.0053 | | |
| Ecosurf EH-6 | | | | | | | 0.0056 | |
| LAE 24-7 | | | | | | | | 0.0051 |
| Acusol 820 | | 0.02 | | | | | | |

TABLE 1-continued

Various Polishing Compositions

| Component | | | | | | | | |
|---|---|---|---|---|---|---|---|---|
| Colloidal silica, Nalco 2325, 40-50% | 100 | | 49.975 | 49.9949 | 49.9948 | 49.9947 | 49.9944 | 49.9949 |
| Colloidal silica, TX15763, 30-50% | | 100 | | | | | | |
| Total | 100 | 100 | 50 | 50 | 50 | 50 | 50 | 50 |
| Surfactant, ppm | 0 | 0 | 100 | 102 | 52 | 106 | 112 | 102 |

| Component | 7 | 8 | 9 | 10 | 11 |
|---|---|---|---|---|---|
| Dynol 604 | 0.0053 | | | | |
| Dynol 607 | | 0.0053 | | | |
| EnviroGem, 360, 95% | | | 0.005 | | |
| EnviroGem AD01 | | | | 0.0054 | |
| Surfynol 420 | | | | | 0.0051 |
| Colloidal silica, Nalco 2325, 40-50% | 49.9947 | 49.9947 | 49.995 | 49.9946 | 49.9949 |
| Total | 50 | 50 | 50 | 50 | 50 |
| Surfactant, ppm | 106 | 106 | 95 | 108 | 102 |
| Polyacrylate, ppm | 0 | 0 | 0 | 0 | 0 |

| Component | 12 | 13 | 14 | 15 | 16 |
|---|---|---|---|---|---|
| Dynol 604 | | 0.0052 | | | |
| Dynol 607 | | | 0.005 | | |
| Rhodafac RS410, 98% | 0.005 | | | | |
| Exp Extended guerbet, 8PO-8EO | | | | 0.0055 | |
| LAE 24-7 | | | | | 0.005 |
| Acusol 445N | | 0.0076 | 0.0068 | 0.006 | 0.0056 |
| Colloidal silica, Nalco 2325, 40-50% | 49.995 | 49.9872 | 49.9882 | 49.9885 | 49.9894 |
| Total | 50 | 50 | 50 | 50 | 50 |
| Surfactant, ppm | 98 | 104 | 100 | 110 | 100 |
| Polyacrylate, ppm | 0 | 152 | 136 | 120 | 112 |

| Component | 17 | 18 | 19 | 20 | 21 |
|---|---|---|---|---|---|
| Acusol 820, 23% | 0.0196 | | | | |
| X-AES, 23.5% | | 0.0225 | | | |
| Tegopren 6950 | | | | 0.0054 | |
| Tegopren 5840, 75% | | | | | 0.0072 |
| Dynol 800, 80% | | | 0.0066 | | |
| Colloidal silica, Nalco 2325, 40-50% | 49.9804 | 49.9775 | 49.9934 | 49.9946 | 49.9928 |
| Total | 50 | 50 | 50 | 50 | 50 |
| Surfactant, ppm | 90 | 106 | 106 | 108 | 108 |

| Component | 22 | 23 | 24 | 25 | 26 |
|---|---|---|---|---|---|
| Tegopren 5852 | 0.0052 | | | | |
| Tegopren 5843, 95% | | 0.0068 | | | |
| LF-221 | | | 0.005 | | |
| PEA-25 | | | | | |
| Plurafac SL-62 | | | | | 0.0048 |
| Dynol 800, 80% | | | | | |
| Dynol 810, 70% | | | | 0.0066 | |
| Colloidal silica, Nalco 2325, 40-50% | 49.9948 | 49.9932 | 49.995 | 49.9934 | 49.9952 |
| Total | 50 | 50 | 50 | 50 | 50 |
| Surfactant, ppm | 104 | 129 | 100 | 92 | 96 |

| Component | 27 | 28 | 29 | 30 | 31 | 32 | 33 |
|---|---|---|---|---|---|---|---|
| Plurafac SL-62 | 0.0056 | | | | | | |
| Dow 500W Additive, 70-90% | | 0.007 | | | | | |
| Dow 501W Additive, 70-90% | | | 0.0065 | | | | |
| Dow 502W Additive, 70-90% | | | | 0.0064 | | | |
| Dow 67 Additive, 70-90% | | | | | 0.006 | | |
| Dynol 960, 30-50% | | | | | | 0.0128 | |

TABLE 1-continued

Various Polishing Compositions

| | | | | | | | |
|---|---|---|---|---|---|---|---|
| Dynol 980, 30-50% | | | | | | | 0.0126 |
| Colloidal silica, Nalco 2325, 40-50% | 49.9944 | 49.993 | 49.9935 | 49.9936 | 49.994 | 49.9872 | 49.9874 |
| Total | 50 | 50 | 50 | 50 | 50 | 50 | 50 |
| Surfactant, ppm | 112 | 112 | 104 | 102 | 96 | 102 | 101 |

| Component | 34 | 35 | 36 | 37 |
|---|---|---|---|---|
| Tetronic 701 | 0.0049 | | | |
| Tetronic 90R4 | | 0.0047 | | |
| Silwet L-77 | | | 0.0053 | |
| Plurafact SL-42 | | | | 0.0055 |
| APG, RD 100818, 50% | | | | |
| APG, RD 200609, 50% | | | | |
| Colatrope | | | | |
| DRA, 24% | | | | |
| FINITO, 7.32% | | | | |
| Colloidal silica, Nalco 2325, 40-50% | 49.9951 | 49.9953 | 49.9947 | 49.9945 |
| Total | 50 | 50 | 50 | 50 |
| Surfactant, ppm | 98 | 94 | 106 | 110 |

| Component | 38 | 39 | 40 | 41 | 42 |
|---|---|---|---|---|---|
| Tetronic 701 | | | | | |
| Tetronic 90R4 | | | | | |
| Silwet L-77 | | | | | |
| Plurafact SL-42 | | | | | |
| APG, RD 100818, 50% | 0.0107 | | | | |
| APG, RD 200609, 50% | | 0.0104 | | | |
| Colatrope | | | 0.0056 | | |
| DRA, 24% | | | | 0.0227 | |
| FINITO, 7.32% | | | | | 0.077 |
| Colloidal silica, Nalco 2325, 40-50% | 49.9893 | 49.9896 | 49.9944 | 49.9773 | 49.923 |
| Total | 50 | 50 | 50 | 50 | 50 |
| Surfactant, ppm | 107 | 104 | 112 | 104 | 113 |

| Component | 43 | 44 | 45 | 46 | 47 |
|---|---|---|---|---|---|
| Exp extended guerbet, 8EO-8PO | 0.0047 | | | | |
| X-AES, 23.5% | | | | | |
| Dynol 960, 40% | | | | | |
| Marlowet 4539, 90% | | 0.0055 | | | |
| Alfoterra 123-8S, 90% | | | 0.0056 | | |
| TX16101 (LP-6818-41-IP4) | | | | 0.0153 | |
| Lutensol XL-70 | | | | | 0.005 |
| Colloidal silica, Nalco 2325, 40-50% | 49.9953 | 49.9945 | 49.9944 | 49.9847 | 49.995 |
| Total | 50 | 50 | 50 | 50 | 50 |
| Surfactant, ppm | 94 | 99 | 101 | 306 | 100 |

TABLE 2

Measured Contact Angles for Various Polishing Compositions on Different Polishing Pads
Microfiber Pad, PF-S800E09

| Composition | 1 second | 15 seconds | 30 seconds | Composition | 1 second | 15 seconds | 30 seconds |
|---|---|---|---|---|---|---|---|
| TX15763 | 117.27 | 114.81 | 112.94 | 24 | 116.23 | 78.41 | 67.69 |
| Nalco 2325 | 112.03 | 107.67 | 104.39 | 21 | 112.03 | 90.86 | 69.46 |
| 25 | 68.78 | 30.55 | 21.55 | 11 | 94.44 | 75.8 | 71.4 |
| 19 | 75.31 | 34.32 | 22.57 | 39 | 95.85 | 76.34 | 71.845 |
| 33 | 73.63 | 32.8 | 23.76 | 1 | 101.9 | 76.25 | 72.41 |
| 7 | 78.43 | 39.83 | 31.74 | 10 | 106.38 | 78.68 | 72.5 |
| 18 | 88.44 | 44.22 | 32.83 | 28 | 104.61 | 92.81 | 75.17 |
| 45 | 90.53 | 50.93 | 37.205 | 5 | 109.77 | 85.18 | 77.37 |
| 32 | 72.55 | 45.17 | 40.695 | 27 | 111.76 | 87.89 | 78.01 |

TABLE 2-continued

Measured Contact Angles for Various Polishing
Compositions on Different Polishing Pads

Microfiber Pad, PF-S800E09

| | | | | | | | |
|---|---|---|---|---|---|---|---|
| Lutensol XL-70 | 88 | 48.5 | 41 | 12 | 110.12 | 83.02 | 78.12 |
| 15 | 85.93 | 43.54 | 41.63 | 3 | 113.65 | 90.31 | 79.09 |
| 13 | 76.56 | 50.75 | 41.72 | 26 | 117.45 | 95.26 | 82.11 |
| 8 | 85.24 | 53.93 | 43.8 | 44 | 100.645 | 91.93 | 86.085 |
| 38 | 79.9 | 57.745 | 49.75 | 22 | 109.83 | 97.18 | 91 |
| 16 | 100.27 | 67.13 | 49.83 | 20 | 115.37 | 108.48 | 100.97 |
| APG425 | 89 | 62 | 52 | 30 | 107.51 | 103.11 | 101.7 |
| 43 | 87.165 | 60.865 | 52.89 | 29 | 114.27 | 108.64 | 106.93 |
| 37 | 85.665 | 64.505 | 54.495 | 31 | 112.57 | 109 | 107.6 |
| 41 | 99.72 | 64.755 | 54.845 | 23 | 117.41 | 112.63 | 108.37 |
| 14 | 76.84 | 61.51 | 57.02 | 17 | 118.29 | 113.07 | 109.58 |
| 6 | 103.36 | 71.01 | 59.45 | 2 | 116.94 | 112.91 | 112.02 |
| 9 | 99.25 | 68.78 | 62.91 | 31 | 117.93 | 118.64 | 115.93 |
| 47 | 91.5225 | 70.9125 | 65.125 | 36 | 118.72 | 120.13 | 117.37 |
| 4 | 95.72 | 71.13 | 67.34 | | | | |

Microfiber Pad, SUBA H2 1109

| Composition | 1 second | 15 seconds | 30 seconds | Composition | 1 second | 15 seconds | 30 seconds |
|---|---|---|---|---|---|---|---|
| TX15763 | 114.19 | 105.91 | 105.71 | 21 | 98.08 | 68.45 | 57.39 |
| Nalco 2325 | 107.18 | 99.85 | 94.51 | 36 | 108.53 | 75.59 | 58.73 |
| 32 | 63.34 | 14.6 | 5.81 | 44 | 97.45 | 75.17 | 69.81 |
| 19 | 65.06 | 26.5 | 11.06 | 5 | 104.01 | 78.3 | 71.19 |
| 33 | 67.56 | 24.16 | 13.67 | 27 | 98.72 | 84.88 | 77.1 |
| 25 | 76.43 | 33.08 | 17.29 | 28 | 106.46 | 88.29 | 77.66 |
| 7 | 74.75 | 36.39 | 23.5 | 35 | 101.42 | 85.65 | 80.07 |
| 18 | 89.05 | 40.12 | 24.25 | 26 | 111.24 | 89.09 | 80.46 |
| 13 | 77.18 | 34.55 | 26.19 | 46 | 95.15 | 88.15 | 80.46 |
| 38 | 82.15 | 48.66 | 32.72 | 34 | 108.72 | 92.79 | 81.28 |
| 45 | 87.88 | 47.58 | 35.11 | 20 | 106.29 | 84.18 | 83.48 |
| 15 | 84.23 | 47.06 | 36.61 | 30 | 104.41 | 91.3 | 87.72 |
| 41 | 86.34 | 50.52 | 37.18 | 22 | 109.36 | 91.82 | 89.29 |
| 8 | 89.35 | 47.66 | 39.93 | 29 | 109.91 | 93.92 | 90.77 |
| 37 | 78.85 | 49.19 | 42.83 | 40 | 111.33 | 96.56 | 91.05 |
| 43 | 87.81 | 7.48 | 46.77 | 17 | 112.3 | 97.69 | 92.9 |
| 47 | 92.55 | 56.92 | 48.51 | 31 | 112.6 | 99.77 | 96.43 |
| 39 | 92.52 | 61.18 | 49.16 | 23 | 107.11 | 97.1 | 94.49 |
| 24 | 97.87 | 62.81 | 50.26 | 42 | 107.19 | 98.16 | 100.06 |
| 6 | 104.46 | 63.91 | 52.3 | | | | |

Microfiber Pad, PF-MHNISA050GOL-09

| Composition | 1 second | 15 seconds | 30 seconds |
|---|---|---|---|
| TX15763 | 97.69 | 94.22 | 93.95 |
| Nalco 2325 | 96.59 | 95.67 | 95.64 |
| 32 | 70.58 | 56.98 | 53.16 |
| 25 | 36.66 | 58.51 | 57.36 |
| 33 | 81.18 | 66.79 | 62.72 |
| 19 | 71.33 | 63.91 | 62.84 |
| 45 | 86.3 | 70.2 | 64.56 |
| 43 | 78.98 | 69.3 | 64.99 |
| 13 | 84.71 | 67.96 | 65.42 |
| 7 | 85.3 | 73.02 | 67.67 |
| 18 | 81.46 | 71.28 | 67.74 |
| 15 | 87.98 | 74 | 67.97 |
| 37 | 85.94 | 69.41 | 68.11 |
| 41 | 91.15 | 46.86 | 72.16 |
| 38 | 90.62 | 76.61 | 73.87 |
| 8 | 84.38 | 77.21 | 74.89 |
| 5 | 89.01 | 79.26 | 75.74 |
| 47 | 94.7 | 79.96 | 76.74 |
| 39 | 92.68 | 81.22 | 79.47 |
| 6 | 96.13 | 84.83 | 80.63 |
| 44 | 87.1 | 85.13 | 81.62 |
| 46 | 99.43 | 96.72 | 87.68 |
| 36 | 100.28 | 92.65 | 87.91 |
| 35 | 93.46 | 91.89 | 90.55 |
| 27 | 99.73 | 96.34 | 92.19 |
| 26 | 107.65 | 101.15 | 99.35 |

Example 2

The dynamic surface tension of all surfactants utilized in Example 1 was measured. A contact angle apparatus was used to quantitatively measure the angle at which a drop of surfactant or polishing composition contacts sapphire surface. The polishing composition of desired concentration is placed into the apparatus where a single drop of the composition can be delivered to the sapphire surface. The deliverance of the drop to the substrate is recorded by a camera. The video captured by the camera is sent to a computer were the contact angle can be determined. Results are shown in Table 3.

The data in this example show that there is not a good correlation between a low surface angle at 30 second for a colloidal silica composition with a surfactant and the dynamic surface tension of the corresponding surfactant.

TABLE 3

Measured Dynamic Surface Tensions for Various Polishing Compositions on Different Polishing Pads

|  | Bubble Lifetime (s) | Surface Tension 100 ppm surfactant in water | | | Microfiber Pad: SUBA HA 1109 Contact Angle 100 ppm surfactant in colloidal silica | Microfiber Pad PF-S800E09 |
|---|---|---|---|---|---|---|
|  |  | 1 s | 10 s | 30 s | 30 s | 30 s |
| Dynol 800 | 33.374 | 51.6 | 40.3 | 37.5 | 17.29 | 21.55 |
| Dynol 980 | 34.44 | 38.2 | 31.3 | 28.1 | 13.637 | 23.76 |
| Dynol 604 | 31.152 | 52.6 | 41.3 | 40.5 | 23.5 | 31.74 |
| X-AES | 32.221 | 59.2 | 41.4 | 37.5 | 24.25 | 32.83 |
| Dynol 607 | 32.756 | 48.3 | 40.7 | 38.6 |  | 43.8 |
| APG 200818 | 32.618 | 55.5 | 44.9 | 43.3 | 32.72 | 49.75 |
| APG 425 | 32.647 | 69.3 | 53.6 | 47.3 |  | 52 |
| SL-42 | 34.169 | 52.6 | 40 | 37 | 42.83 | 54.49 |
| LAE 24-7 | 33.819 | 57.3 | 40.3 | 28.5 | 52.3 | 59.45 |
| Envirogem 360 | 34.779 | 69.1 | 62.9 | 58.1 |  | 62.91 |
| XL-70 | 34.506 | 47.3 | 35.4 | 32.5 | 48.51 | 65.12 |
| XP-50 | 33.366 | 51.5 | 44.3 | 42.4 |  | 67.34 |
| LF-221 | 33.714 | 57.5 | 34.8 | 32.5 | 50.26 | 67.69 |
| Tegopren 5840 | 31.653 | 44.2 | 25.1 | 22.9 | 57.39 | 69.46 |
| APG 200609 | 31.554 | 60 | 50.5 | 47.9 | 49.16 | 71.8 |
| DOW 500W | 31.941 | 53.7 | 26.2 | 22.6 | 77.66 | 75.17 |
| EH-6 | 33.134 | 54 | 45.9 | 43.2 | 71.19 | 77.37 |
| Rhodafac RS410 | 31.631 | 68 | 58 | 43.6 |  | 78.12 |
| PEA-25 | 32.049 | 56 | 32.9 | 27.6 | 80.46 | 82.11 |
| Tegopren 5852 | 34.047 | 67.2 | 58 | 55.5 | 89.29 | 91 |
| Tegopren 6950 | 34.821 | 72.9 | 71.4 | 68.3 | 83.48 | 100.97 |
| DOW 501W | 32.632 | 46.5 | 26.7 | 23.3 | 90.77 | 106.93 |
| DOW 67 | 36.007 | 72.3 | 27.3 | 24.1 | 96.43 | 115.93 |
| Silwet L-77 | 34.861 | 49.9 | 26.5 | 23.4 | 58.73 | 117.37 |
| Tetronic 90R4 | 35.366 | 57 | 50.3 | 47.6 | 80.07 |  |
| Tetronic 701 | 34.61 | 47.5 | 42.1 | 41.6 | 81.28 |  |
| Colatrope | 34.5 | 72.8 | 27.7 | 71.9 | 91.05 |  |

Example 3

Utilizing the test procedures described in Example 1, five surfactant compositions and their contact angles were tested on two different sapphire wafers. Surfactant compositions are shown in Table 4. Results are shown in Tables 5-10.

The five polishing compositions were chosen because the five surfactants exhibit the smallest contact angles on the microfiber pads in the previous testing. The data in this example show that these surfactants lower the contact angles on the tested Wafers. The tested surfactants cause a greater reduction in contact angle on a more hydrophobic surface. Among the tested surfactants, Dynol 980 exhibits the lowest contact angle.

TABLE 4

Polishing Compositions Tested on Two Different Sapphire Wafers

| Component | 48 | 49 | 50 | 51 | 52 |
|---|---|---|---|---|---|
| Alfoterra 123-8S, 90% | 0.0058 | | | | |
| Dynol 800, 80% | | 0.0063 | | | |
| X-AES, 23.5% | | | 0.022 | | |
| Dynol 980, 30-50% | | | | 0.0129 | |
| LAE 24-7 | | | | | 0.0047 |
| Colloidal silica, Nalco TX15717, 30-60% | 49.9942 | 49.9937 | 49.978 | 49.9871 | 49.9953 |
| Colloidal silica, TX15763, 30-50% | | | | | |
| Total | 50 | 50 | 50 | 50 | 50 |
| Surfactant, ppm | 104 | 101 | 103 | 103 | 94 |

| Component | 53 | 54 | 55 | 56 | 57 |
|---|---|---|---|---|---|
| Alfoterra 123-8S, 90% | 0.0056 | | | | |
| Dynol 800, 80% | | 0.0059 | | | |
| X-AES, 23.5% | | | 0.0211 | | |
| Dynol 980, 30-50% | | | | 0.0131 | |
| LAE 24-7 | | | | | 0.005 |
| Colloidal silica, Nalco TX15717, 30-60% | | | | | |
| Colloidal silica, TX15763, 30-50% | 49.9944 | 49.9941 | 49.9789 | 49.9869 | 49.995 |
| Total | 50 | 50 | 50 | 50 | 50 |
| Surfactant, ppm | 101 | 94 | 99 | 105 | 100 |

TABLE 5

Contact Angles for Polishing Compositions on a 128 mm Type C Sapphire Wafer
Sapphire Wafer, 128 mm, type C

| Time, seconds | 1 | 15 | 30 |
|---|---|---|---|
| Colloidal Silica, Nalco 2325 | 57.81 | 51.16 | 50.33 |
| Average | 57.81 | 51.16 | 50.33 |
| 18 | 63.96 | 47.9 | 47.05 |
|  | 61.78 | 49.92 | 47.05 |
| Average | 62.87 | 48.91 | 47.05 |
| 45 | 69.92 | 59.09 | 46.81 |
|  | 53.52 | 56.61 | 53.44 |
| Average | 61.72 | 57.85 | 55.13 |
| 25 | 59.28 | 49.89 | 47.02 |
|  | 60.85 | 46.96 | 46.12 |
| Average | 60.07 | 48.43 | 46.57 |
| 6 | 65.01 | 55.48 | 55.27 |
|  | 67.58 | 59.49 | 58.53 |
| Average | 66.3 | 57.49 | 56.9 |
| 33 | 60.41 | 45.86 | 44.78 |
|  | 60.75 | 46.35 | 48.72 |
| Average | 60.58 | 46.11 | 46.75 |

TABLE 6

Contact Angles for Polishing Compositions on a 60 mm Type A Sapphire Wafer
Sapphire Wafer, 60 mm, type A

| Time, seconds | 1 | 15 | 30 |
|---|---|---|---|
| Colloidal Silica, Nalco 2325 | 91.65 | 89.68 | 91.47 |
|  | 93.19 | 91.16 | 90.32 |
| Average | 92.42 | 90.42 | 90.9 |
| 18 | 65.36 | 49.05 | 46.72 |
|  | 66.22 | 49.8 | 46.46 |
| Average | 65.79 | 49.43 | 46.59 |
| 45 | 66.58 | 51.71 | 49.61 |
|  | 65.28 | 46.59 | 46.22 |
| Average | 65.93 | 49.15 | 47.92 |
| 25 | 43.55 | 37.17 | 38.27 |
|  | 50.23 | 41.42 | 39.05 |
| Average | 46.89 | 39.3 | 38.66 |
| 33 | 52.45 | 34.82 | 35.85 |
|  | 44.21 | 33.84 | 33.88 |
| Average | 48.33 | 34.33 | 34.87 |
| 6 | 70.83 | 62.82 | 58.71 |
| Average | 70.83 | 62.82 | 58.71 |

TABLE 7

Contact Angles for Polishing Compositions on a 128 mm Type C Sapphire Wafer
Sapphire Wafer, 128 mm, type C

| Time, seconds | 1 | 15 | 30 |
|---|---|---|---|
| Colloidal Silica, TX15717 | 70.46 | 68.95 | 66.75 |
| Average | 70.46 | 68.95 | 66.75 |
| 49 | 78.89 | 65.9 | 63.42 |
| Average | 78.89 | 65.9 | 63.42 |
| 48 | 90.57 | 62.77 | 58.18 |
|  | 81.8 | 58.65 | 57.09 |
| Average | 86.16 | 60.71 | 57.64 |
| 50 | 79.31 | 66.98 | 66.24 |
| Average | 79.31 | 66.98 | 66.24 |
| 51 | 76.33 | 70.95 | 66.88 |

TABLE 7-continued

Contact Angles for Polishing Compositions
on a 128 mm Type C Sapphire Wafer
Sapphire Wafer, 128 mm, type C

| Time, seconds | 1 | 15 | 30 |
|---|---|---|---|
| Average | 76.33 | 70.95 | 66.88 |
| 52 | 87.52 | 85.77 | 83.68 |
| Average | 87.52 | 85.77 | 83.68 |

TABLE 8

Contact Angles for Polishing Compositions
on a 60 mm Type A Sapphire Wafer
Sapphire Wafer, 60 mm, type A

| | Time, seconds | | |
|---|---|---|---|
| | 1 | 15 | 30 |
| Colloidal Silica, TX15717 | 87.23 | 87.65 | 85.7 |
| | 89.98 | 92.15 | 89.54 |
| Average | 88.61 | 59.9 | 87.62 |
| 48 | 79.75 | 59.23 | 57.71 |
| Average | 79.75 | 59.23 | 57.71 |
| 50 | 91.55 | 73.35 | 69.71 |
| Average | 91.55 | 73.35 | 69.71 |
| 51 | 79.9 | 61.5 | 59.89 |
| | 65.59 | 56 | 55.83 |
| Average | 72.8 | 58.75 | 57.86 |
| 49 | 74.19 | 65.66 | 63.91 |
| Average | 74.19 | 65.66 | 63.91 |
| 52 | 90.29 | 72.84 | 69.38 |
| Average | 90.29 | 72.84 | 69.38 |

TABLE 9

Contact Angles for Polishing Compositions
on a 128 mm Type C Sapphire Wafer
Sapphire Wafer, 128 mm, type C

| | Time, seconds | | |
|---|---|---|---|
| | 1 | 15 | 30 |
| Colloidal Silica, TX15763 | 83 | 82.42 | 82.64 |
| | 95 | 80.57 | 79.88 |
| Average | 89 | 81.5 | 81.26 |
| 54 | 61.15 | 53.02 | 47.6 |
| Average | 61.15 | 53.02 | 47.6 |
| 53 | 70.11 | 55.43 | 51.78 |
| Average | 70.11 | 55.43 | 51.78 |
| 55 | 63.44 | 54.24 | 52.95 |
| Average | 63.44 | 54.24 | 52.95 |
| 56 | 59.85 | 47.56 | 43.68 |

TABLE 9-continued

Contact Angles for Polishing Compositions
on a 128 mm Type C Sapphire Wafer
Sapphire Wafer, 128 mm, type C

| | Time, seconds | | |
|---|---|---|---|
| | 1 | 15 | 30 |
| Average | 59.85 | 47.56 | 43.68 |
| 57 | 73.25 | 56.85 | 49.47 |
| Average | 73.25 | 56.85 | 49.47 |

TABLE 10

Contact Angles for Polishing Compositions
on a 60 mm Type A Sapphire Wafer
Sapphire Wafer, 60 mm, type A

| | Time, seconds | | |
|---|---|---|---|
| | 1 | 15 | 30 |
| Colloidal Silica, TX15763 | 87.45 | 78.62 | 75.49 |
| | 79.09 | 74.79 | 73.63 |
| Average | 83.27 | 76.71 | 74.56 |
| 53 | 67.09 | 51.31 | 48.62 |
| | 65.99 | 51.61 | 48.61 |
| Average | 66.54 | 51.46 | 48.62 |
| 55 | 66.59 | 54.03 | 47.29 |
| | 67.61 | 53.94 | 51.06 |
| Average | 67.1 | 53.99 | 49.18 |
| 56 | 62.11 | 46.78 | 41.98 |
| | 59.09 | 45.81 | 40.02 |
| Average | 60.6 | 46.3 | 41 |
| 57 | 66.9 | 40.84 | 34.98 |
| | 71.03 | 44.43 | 37.87 |
| Average | 68.97 | 42.64 | 36.43 |
| 54 | 63.79 | 50.99 | 46.39 |
| Average | 63.79 | 50.99 | 46.39 |

Example 4

Utilizing the test procedures described in Example 1, five surfactant compositions, which include potassium sulfate, and their contact angles were tested on two different sapphire wafers. Surfactant compositions are shown in Tables 11. Results are shown in Tables 12-17.

Studies have shown that increasing the ionic strength of colloidal silica solution increases the removal rate. The reason to explain the increased rate is that increasing the ionic strength decreases the electrostatic repulsion between the colloidal silica and the substrate, the sapphire wafer. The data in this example show that the addition of potassium sulfate into colloidal silica and surfactant composition cause more reduction of contact angles, although to different degree, depending on the substrate.

TABLE 11

Polishing Compositions Including Potassium Sulfate and Surfactants

| Component | 58 | 59 | 60 | 61 | 62 |
|---|---|---|---|---|---|
| Alfoterra 123-8S, 90% | 0.0058 | | | | |
| Dynol 800, 80% | | 0.0063 | | | |
| X-AES, 23.5% | | | 0.022 | | |
| Dynol 980, 30-50% | | | | 0.0129 | |
| LAE 24-7 | | | | | 0.005 |
| K$_2$SO$_4$, 10% | 1 | 1 | 1 | 1 | 1 |
| Colloidal silica, Nalco TX15717, 30-60% | 48.9942 | 48.9937 | 48.978 | 48.9871 | 48.995 |
| Colloidal silica, Nalco 2325, 40-50% | | | | | |
| Colloidal silica, TX15763, 30-50% | | | | | |
| Total | 50 | 50 | 50 | 50 | 50 |
| Surfactant, ppm | 104 | 101 | 103 | 103 | 100 |
| Buffer Total, ppm | 2000 | 2000 | 2000 | 2000 | 2000 |

| Component | 63 | 64 | 65 | 66 | 67 |
|---|---|---|---|---|---|
| Alfoterra 123-8S, 90% | 0.0058 | | | | |
| Dynol 800, 80% | | 0.0063 | | | |
| X-AES, 23.5% | | | 0.022 | | |
| Dynol 980, 30-50% | | | | 0.0129 | |
| LAE 24-7 | | | | | 0.005 |
| K$_2$SO$_4$, 10% | 1 | 1 | 1 | 1 | 1 |
| Colloidal silica, Nalco TX15717, 30-60% | | | | | |
| Colloidal silica, Nalco 2325, 40-50% | | | | | |
| Colloidal silica, TX15763, 30-50% | 48.9942 | 48.9937 | 48.978 | 48.9871 | 48.995 |
| Total | 50 | 50 | 50 | 50 | 50 |
| Surfactant, ppm | 104 | 101 | 103 | 103 | 100 |
| Buffer Total, ppm | 2000 | 2000 | 2000 | 2000 | 2000 |

| Component | 68 | 69 | 70 | 71 | 72 |
|---|---|---|---|---|---|
| Alfoterra 123-8S, 90% | 0.0057 | | | | |
| Dynol 800, 80% | | 0.0049 | | | |
| X-AES, 23.5% | | | 0.0052 | | |
| Dynol 980, 30-50% | | | | 0.0056 | |
| LAE 24-7 | | | | | 0.0054 |
| K2SO4, 10% | 1 | 1 | 1 | 1 | 1 |
| Colloidal silica, Nalco TX15717, 30-60% | | | | | |
| Colloidal silica, Nalco 2325, 40-50% | 48.9943 | 48.9951 | 48.9948 | 48.9944 | 48.9946 |
| Colloidal silica, TX15763, 30-50% | | | | | |
| Total | 50 | 50 | 50 | 50 | 50 |
| Surfactant, ppm | 103 | 78 | 24 | 45 | 108 |
| Buffer Total, ppm | 2000 | 2000 | 2000 | 2000 | 2000 |

TABLE 12

Contact Angles for Various Polishing Compositions Including Potassium Sulfate and Surfactants on a 128 mm Type C Sapphire Wafer
Sapphire Wafer, 128 mm, type C

| Time, seconds | 1 | 15 | 30 |
|---|---|---|---|
| Colloidal Silica, Nalco 2325 | 58.71 | 51.16 | 50.33 |
| Average | 58.71 | 51.16 | 50.33 |
| 68 | 63.67 | 48.78 | 42.37 |
|  | 65.13 | 46.08 | 44.32 |
|  | 70.06 | 50.62 | 45.88 |
| Average | 66.29 | 48.49 | 44.19 |
| 69 | 59.36 | 46.02 | 42.34 |
|  | 57.041 | 46.1 | 43.3 |
|  | 61.17 | 44.15 | 39.18 |

TABLE 12-continued

Contact Angles for Various Polishing Compositions Including Potassium Sulfate and Surfactants on a 128 mm Type C Sapphire Wafer
Sapphire Wafer, 128 mm, type C

| Time, seconds | 1 | 15 | 30 |
|---|---|---|---|
| Average | 59.18 | 45.42 | 41.61 |
| 70 | 83.01 | 70.81 | 65.67 |
|  | 72.72 | 63.54 | 62.15 |
|  | 77.78 | 68.36 | 64.64 |
| Average | 77.84 | 67.57 | 64.15 |
| 71 | 65.58 | 46.58 | 45.84 |
|  | 65.33 | 50.57 | 47.85 |
|  | 63.73 | 42.53 | 38.21 |
| Average | 64.88 | 46.56 | 43.97 |
| 72 | 76 | 57.38 | 50.47 |
|  | 75.3 | 52.96 | 47.67 |
|  | 70.93 | 49.6 | 46.12 |
| Average | 74.08 | 53.31 | 48.09 |

TABLE 13

Contact Angles for Various Polishing Compositions Including Potassium Sulfate and Surfactants on a 60 mm Type A Sapphire Wafer
Sapphire Wafer, 60 mm, type A

| Time, seconds | 1 | 15 | 30 |
|---|---|---|---|
| Colloidal Silica, Nalco 2325 | 91.65 | 89.68 | 91.47 |
|  | 93.19 | 91.16 | 90.32 |
| Average | 92.42 | 90.42 | 90.9 |
| 68 | 64.02 | 30.1 | 24.58 |
|  | 48.54 | 33.08 | 27.58 |
|  | 44.61 | 21.34 | 19.42 |
| Average | 52.39 | 28.17 | 23.86 |
| 69 | 74.81 | 39.8 | 34.83 |
|  | 65.19 | 35.13 | 31.65 |
|  | 56.71 | 33.14 | 27.7 |
| Average | 65.57 | 36.02 | 31.39 |
| 70 | 80 | 78 | 74.36 |
|  | 81 | 78.59 | 78.03 |
|  | 82.79 | 79.66 | 76.18 |
| Average | 82.26 | 78.75 | 76.19 |
| 71 | 69.08 | 53.55 | 49.56 |
|  | 61.63 | 31.16 | 25.21 |
|  | 62.99 | 43.39 | 36.87 |
| Average | 64.57 | 42.7 | 37.21 |
| 72 | 62.61 | 31.98 | 27.66 |
|  | 73.28 | 36.55 | 30.49 |
|  | 61.25 | 42.28 | 38.31 |
| Average | 65.71 | 36.94 | 32.15 |

TABLE 14

Contact Angles for Various Polishing Compositions Including Potassium Sulfate and Surfactants on a 128 mm Type C Sapphire Wafer
Sapphire Wafer, 128 mm, type C

| Time, seconds | 1 | 15 | 30 |
|---|---|---|---|
| Colloidal Silica, TX15717 | 70.46 | 68.95 | 66.75 |
| Average | 70.46 | 68.95 | 66.75 |
| 58 | 77.77 | 67.97 | 61.42 |
| Average | 77.77 | 67.97 | 61.42 |
| 59 | 68.3 | 57.08 | 54.92 |
| Average | 68.3 | 57.08 | 54.92 |
| 60 | 92.53 | 76.06 | 77.68 |
| Average | 92.53 | 76.06 | 77.68 |
| 61 | 51.74 | 43.55 | 40.1 |
|  | 70.41 | 48.49 | 43.94 |
| Average | 61.08 | 46.02 | 42.02 |
| 62 | 84.08 | 82.51 | 81.46 |
| Average | 84.08 | 82.51 | 81.46 |

TABLE 15

Contact Angles for Various Polishing Compositions Including Potassium Sulfate and Surfactants on a 60 mm Type A Sapphire Wafer
Sapphire Wafer, 60 mm, type A

| Time, seconds | 1 | 15 | 30 |
|---|---|---|---|
| Colloidal Silica, TX15717 | 87.23 | 87.65 | 85.7 |
|  | 89.98 | 92.15 | 89.54 |
| Average | 88.61 | 89.9 | 87.62 |
| 58 | 80.53 | 67.2 | 62.34 |
| Average | 80.53 | 67.2 | 62.34 |
| 59 | 69.49 | 54.88 | 53.54 |
| Average | 69.49 | 54.88 | 53.54 |
| 60 | 76.9 | 71 | 68.08 |
| Average | 76.9 | 71 | 68.08 |
| 61 | 79.32 | 58.89 | 55.24 |
|  | 67.82 | 51.03 | 47 |
| Average | 73.57 | 54.96 | 51.12 |
| 62 | 81.94 | 80.05 | 77.12 |
| Average | 81.94 | 80.05 | 77.12 |

TABLE 16

Contact Angles for Various Polishing Compositions Including Potassium Sulfate and Surfactants on a 128 mm Type C Sapphire Wafer
Sapphire Wafer, 128 mm, type C

| Time, seconds | 1 | 15 | 30 |
|---|---|---|---|
| Colloidal Silica, TX15763 | 83 | 82.42 | 82.64 |
|  | 95 | 80.57 | 79.88 |
| Average | 89 | 81.5 | 81.26 |
| 63 | 61.42 | 38.99 | 37.49 |
| Average | 61.42 | 38.99 | 37.49 |
| 64 | 63.65 | 46.12 | 42.34 |
| Average | 63.65 | 46.12 | 42.34 |
| 65 | 62.94 | 46.72 | 41.96 |
| Average | 62.94 | 46.72 | 41.96 |
| 66 | 55.69 | 47.95 | 37.37 |
| Average | 55.69 | 47.95 | 37.37 |
| 67 | 64.59 | 43.12 | 34.66 |
| Average | 64.59 | 43.12 | 34.66 |

TABLE 17

Contact Angles for Various Polishing Compositions Including Potassium Sulfate and Surfactants on a 60 mm Type A Sapphire Wafer
Sapphire Wafer, 60 mm, type A

| Time, seconds | 1 | 15 | 30 |
|---|---|---|---|
| Colloidal Silica, TX15763 | 87.45 | 78.62 | 75.49 |
|  | 79.09 | 74.79 | 73.63 |
| Average | 83.27 | 76.71 | 74.56 |
| 63 | 68.32 | 44.66 | 40.72 |
| Average | 68.32 | 44.66 | 40.72 |
| 64 | 61.42 | 44.06 | 38.9 |
| Average | 61.42 | 44.06 | 38.9 |
| 65 | 61.39 | 42.08 | 38.04 |
| Average | 61.39 | 42.08 | 38.04 |
| 66 | 52.66 | 39.93 | 37.26 |
| Average | 52.66 | 39.93 | 37.26 |
| 67 | 67.7 | 50.66 | 41.13 |
|  | 74.1 | 48.09 | 40.97 |
| Average | 70.9 | 49.38 | 41.05 |

Example 5

Utilizing the test procedures described in Example 1, five compositions, which include potassium sulfate and do not include surfactants, and their contact angles were tested on two different sapphire wafers. Tested compositions are shown in Tables 18. Results are shown in Tables 19-24.

The data show that potassium sulfate causes some reduction of contact angle on Wafer A, but does not for Wafer C. Using potassium sulfate alone is not effective.

TABLE 18

Various Polishing Compositions without a Surfactant

| Component | 73 | 74 | 75 | 76 | 77 |
|---|---|---|---|---|---|
| Colloidal silica, Nalco TX15717, 30-60% | 49.9 | 50.6 | 49 | 48 | 47 |
| Colloidal silica, TX15763, 30-50% | | | | | |
| Colloidal silica, Nalco 2325, 40-50% | | | | | |
| K$_2$SO$_4$, 9% | 0.1 | 0.5 | 1 | 2 | 3 |
| Total | 50 | 51.1 | 50 | 50 | 50 |
| Buffer Total, ppm | 180 | 900 | 1800 | 3600 | 5400 |

| Component | 78 | 79 | 80 | 81 | 82 |
|---|---|---|---|---|---|
| Colloidal silica, Nalco TX15717, 30-60% | | | | | |
| Colloidal silica, TX15763, 30-50% | 49.89 | 49.42 | 48.88 | 47.73 | 46.66 |
| Colloidal silica, Nalco 2325, 40-50% | | | | | |
| K2SO4, 9% | 0.11 | 0.58 | 1.12 | 2.23 | 3.34 |
| Total | 50 | 50 | 50 | 49.96 | 50 |
| Buffer Total, ppm | 198 | 1044 | 2016 | 4014 | 6012 |

| Component | 83 | 84 | 85 | 86 | 87 |
|---|---|---|---|---|---|
| Colloidal silica, Nalco TX15717, 30-60% | | | | | |
| Colloidal silica, TX15763, 30-50% | | | | | |
| Colloidal silica, Nalco 2325, 40-50% | 53.2 | 49.41 | 48.88 | 54.88 | 46.66 |
| K2SO4, 9% | 0.12 | 0.59 | 1.12 | 2.23 | 3.34 |
| Total | 53.32 | 50 | 50 | 57.11 | 50 |
| Buffer Total, ppm | 203 | 1062 | 2016 | 4014 | 6012 |

TABLE 19

Contact Angles Measured for Various Polishing Compositions without a Surfactant on a 128 mm Type C Sapphire Wafer
Sapphire Wafer, 128 mm, type C

| Time, seconds | 1 | 15 | 30 |
|---|---|---|---|
| Colloidal Silica, TX15717 | 70.46 | 68.95 | 66.75 |
| Average | 70.46 | 68.95 | 66.75 |
| 73 | 70.94 | 63.95 | 61.76 |
| Average | 70.94 | 63.95 | 61.76 |
| 74 | 71.15 | 65.71 | 63.36 |
| Average | 71.15 | 65.71 | 63.36 |
| 75 | 69.15 | 56.95 | 56.41 |
| Average | 69.15 | 56.95 | 56.41 |
| 76 | 67.4 | 57.83 | 56.02 |
| Average | 67.4 | 57.83 | 56.02 |
| 77 | 55.46 | 50.08 | 47.6 |
| Average | 55.46 | 50.08 | 47.6 |

TABLE 20

Contact Angles Measured for Various Polishing Compositions without a Surfactant on 60 mm Type A Sapphire Wafer
Sapphire Wafer, 60 mm, type A

| Time, seconds | 1 | 15 | 30 |
|---|---|---|---|
| Colloidal Silica, TX15717 | 87.23 | 87.65 | 85.7 |
| | 89.98 | 92.15 | 89.54 |
| Average | 88.61 | 89.9 | 87.62 |
| 73 | 78.03 | 76.73 | 76.72 |
| | 78.2 | 75.9 | 75.67 |
| Average | 78.12 | 76.32 | 76.2 |
| 74 | 86.53 | 85.98 | 87.17 |
| | 81.9 | 80.41 | 78.44 |
| Average | 84.22 | 83.2 | 82.81 |
| 75 | 81.93 | 81.38 | 80.35 |
| | 77.72 | 80.6 | 80.16 |
| Average | 79.83 | 80.99 | 80.26 |
| 76 | 80.47 | 74.6 | 73.39 |
| | 80.54 | 67.54 | 65.47 |
| Average | 80.51 | 71.07 | 69.43 |
| 77 | 83.39 | 78.96 | 78.26 |
| | 85.38 | 73.7 | 72.89 |
| Average | 84.39 | 76.33 | 75.58 |

TABLE 21

Contact Angles Measured for Various Polishing Compositions without a Surfactant on a 128 mm Type C Sapphire Wafer
Sapphire Wafer, 128 mm, type C

| Time, seconds | 1 | 15 | 30 |
|---|---|---|---|
| Colloidal Silica, TX15763 | 83 | 92.42 | 82.64 |
| | 95 | 90.57 | 79.88 |
| Average | 89 | 81.5 | 81.26 |
| 78 | 59.32 | 50.65 | 48.44 |
| Average | 59.32 | 50.65 | 48.44 |
| 79 | 53.14 | 44.19 | 43.53 |
| Average | 53.14 | 44.19 | 43.53 |
| 80 | 65.25 | 57.82 | 60.34 |
| Average | 65.25 | 57.82 | 60.34 |
| 81 | 75.48 | 67.46 | 65.18 |
| Average | 75.48 | 67.46 | 65.18 |
| 82 | 65.26 | 51.45 | 50.42 |
| Average | 65.26 | 51.45 | 50.42 |

TABLE 22

Contact Angles Measured for Various Polishing Compositions without a Surfactant on a 60 mm Type A Sapphire Wafer
Sapphire Wafer, 60 mm, type A

| Time, seconds | 1 | 15 | 30 |
|---|---|---|---|
| Colloidal Silica, TX15763 | 87.45 | 78.62 | 75.49 |
| | 79.09 | 74.79 | 73.63 |
| Average | 83.27 | 76.71 | 74.56 |
| 78 | 84.35 | 83.96 | 82.84 |
| | 80.67 | 78.65 | 79.07 |
| Average | 82.51 | 81.31 | 80.96 |
| 79 | 78.08 | 77.26 | 78.6 |
| | 84.62 | 81.41 | 78.82 |
| Average | 81.35 | 79.34 | 78.71 |
| 80 | 83.58 | 81.96 | 80.6 |
| | 82.54 | 79.13 | 77.36 |
| Average | 83.04 | 80.55 | 78.98 |
| 81 | 82.841 | 72.41 | 71.57 |
| | 69.74 | 71.82 | 71.52 |
| Average | 71.29 | 72.12 | 71.55 |

Formula 82: could not measure, solution was separated and had large precipitate.

TABLE 23

Contact Angles Measured for Various Polishing Compositions without a Surfactant on a 128 mm Type C Sapphire Wafer
Sapphire Wafer, 128 mm, type C

| Time, seconds | 1 | 15 | 30 |
|---|---|---|---|
| Colloidal Silica, Nalco 2325 | 58.71 | 51.16 | 50.33 |
| Average | 58.71 | 51.16 | 50.33 |
| 83 | 67.02 | 60.01 | 57.86 |
| Average | 67.02 | 60.01 | 57.86 |
| 84 | 72.21 | 61.17 | 59.91 |
| Average | 72.21 | 61.17 | 59.91 |
| 85 | 75.71 | 60.6 | 56.37 |
| Average | 75.71 | 60.6 | 56.37 |
| 86 | 75.98 | 60.11 | 58.28 |
| Average | 75.98 | 60.11 | 58.28 |
| 87 | 68.89 | 64.73 | 61.88 |
| Average | 68.89 | 64.73 | 61.88 |

TABLE 24

Contact Angles Measured for Various Polishing Compositions without a Surfactant on a 60 mm Type A Sapphire Wafer
Sapphire Wafer, 60 mm, type A

| Time, seconds | 1 | 15 | 30 |
|---|---|---|---|
| Colloidal Silica, Nalco 2325 | 91.65 | 89.68 | 91.47 |
|  | 93.19 | 91.16 | 90.32 |
| Average | 92.42 | 90.42 | 90.9 |
| 83 | 80.36 | 79.3 | 79.81 |
|  | 80.63 | 82.65 | 79.87 |
| Average | 80.5 | 80.98 | 79.84 |
| 84 | 75.22 | 73.91 | 71.62 |
|  | 79.62 | 80.38 | 79.86 |
| Average | 77.42 | 77.15 | 75.74 |
| 85 | 75.08 | 76.12 | 75.78 |
|  | 73.61 | 73 | 71.76 |
| Average | 74.35 | 74.56 | 73.77 |
| 86 | 88.98 | 83.06 | 84.09 |
|  | 91.11 | 83.62 | 84.48 |
| Average | 90.05 | 83.34 | 82.79 |

Example 6

The effect of surfactant concentration was studied to determine whether a decrease or increase in the surfactant concentration impacts contact angle. For this example, three surfactants were considered as representative three categories of surfactants: Dynol 980, a gemini surfactant; X-AES, an extended surfactant; and LAE 24-7, a linear alcohol ethoxylate.

Varying concentrations of Dynol 980 were studied in different colloidal silica. Test formulations using Nalco 2325 colloidal silica are shown in Table 25. The results of testing on different types of sapphire wafers are shown in Tables 26 and 27.

TABLE 25

Dynol 980 and Nalco 2325 Formulations Tested

| Component | 88 | 89 | 90 | 33 |
|---|---|---|---|---|
| Dynol 980, 30-50% | 0.0410 | 0.2912 | 0.0063 | 0.0126 |
| Colloidal silica, Nalco TX15717, 30-60%, pH = 2.5 |  |  |  |  |

TABLE 25-continued

Dynol 980 and Nalco 2325 Formulations Tested

| Component | 88 | 89 | 90 | 33 |
|---|---|---|---|---|
| Colloidal silica, Nalco 2325, 40-50%, pH = 9.5 | 49.9590 | 49.7088 | 49.9975 | 49.9874 |
| Colloidal silica, TX15763, 30-50%, pH = 2.97 |  |  |  |  |
| Total | 50.0000 | 50.0000 | 50.0038 | 50.0000 |
| Surfactant Total, ppm | 328 | 2330 | 50 | 101 |

TABLE 26

Contact Angles Measured for Dynol 980 Polishing Compositions on a 128 mm Type C Sapphire Wafer
Sapphire Wafer, 128 mm, type C

| Time, seconds | 1 | 15 | 30 |
|---|---|---|---|
| Colloidal Silica, Nalco 2325 | 58.71 | 51.16 | 50.33 |
| Average | 58.71 | 51.16 | 50.33 |
| 90 | 47.84 | 40.78 | 39.20 |
|  | 45.42 | 39.89 | 38.41 |
|  | 47.39 | 43.53 | 40.99 |
| Average | 46.88 | 41.40 | 39.53 |
| 33 | 60.41 | 45.86 | 44.78 |
|  | 60.75 | 46.35 | 48.72 |
| average | 60.58 | 46.11 | 46.75 |
| 88 | 38.39 | 29.90 | 27.43 |
|  | 33.52 | 32.86 | 31.70 |
|  | 33.92 | 32.45 | 34.67 |
| Average | 35.28 | 31.74 | 31.27 |
| 89 | 30.46 | 29.01 | 28.78 |
|  | 29.84 | 28.95 | 26.77 |
|  | 29.73 | 30.56 | 27.02 |
| Average | 30.01 | 29.51 | 27.52 |

The data in Table 26 shows no significant difference was found in the 30 second contact angle of the surfactant concentration with the concentration varying between about 50 ppm and about 100 ppm (test formulations 90 and 33); however at greater than about 300 ppm, the 30 second contact angle is significantly reduced (formulations 88 and 89).

TABLE 27

Contact Angles Measured for Dynol 980 Polishing Compositions on a 60 mm Type A Sapphire Wafer
Sapphire Wafer, 60 mm, type A

| Time, seconds | 1 | 15 | 30 |
|---|---|---|---|
| Colloidal Silica, Nalco 2325 | 91.65 | 89.68 | 91.47 |
|  | 93.19 | 91.16 | 90.32 |
| Average | 92.42 | 90.42 | 90.90 |
| 90 | 59.72 | 46.75 | 48.60 |
|  | 58.44 | 49.41 | 46.39 |
|  | 61.76 | 51.38 | 48.52 |
| Average | 59.97 | 49.18 | 47.84 |
| 33 | 52.45 | 34.82 | 35.85 |
|  | 44.21 | 33.84 | 33.88 |
| Average | 48.33 | 34.33 | 34.87 |
| 88 | 38.21 | 34.46 | 32.31 |
|  | 40.12 | 35.65 | 33.37 |
|  | 42.46 | 35.78 | 31.49 |
| Average | 40.26 | 35.30 | 32.39 |
| 89 | 35.05 | 30.55 | 30.23 |
|  | 36.25 | 29.46 | 29.92 |
|  | 34.55 | 28.81 | 27.91 |
| Average | 35.28 | 29.61 | 29.35 |

The data in Table 27 shows that below 100 ppm surfactant (formulation 90), the 30 second contact angle was slightly higher, which is worse. For the concentrations of about 100 ppm or greater (formulations 88, 89, and 33), the contact angle was improved (lower), but no significant difference was observed in the 30 second contact angle.

Varying concentrations of Dynol 980 were studied in formulations with TX15763 colloidal silica as shown in Table 28. The results of testing on different types of sapphire wafers are shown in Tables 29 and 30.

TABLE 28

Dynol 980 and TX15763 Formulations Tested

| Component | 91 | 92 | 93 | 56 |
|---|---|---|---|---|
| Dynol 980, 30-50% | 0.0260 | 0.3005 | 0.0063 | 0.0131 |
| Colloidal silica, Nalco TX15717, 30-60%, pH = 2.5 | | | | |
| Colloidal silica, Nalco 2325, 40-50%, pH = 9.5 | | | | |
| Colloidal silica, TX15763, 30-50%, pH = 2.97 | 49.9740 | 49.6995 | 49.9937 | 49.9869 |
| Total | 50.0000 | 50.0000 | 50.0000 | 50.0000 |
| Surfactant Total, ppm | 208 | 2404 | 50 | 105 |

TABLE 29

Contact Angles Measured for Dynol 980 Polishing Compositions on a 60 mm Type A Sapphire Wafer
Sapphire Wafer, 60 mm, type A

| Time, seconds | 1 | 15 | 30 |
|---|---|---|---|
| Colloidal Silica, TX 15763 | 87.45 | 78.62 | 75.49 |
| | 79.09 | 74.79 | 73.63 |
| Average | 83.27 | 76.71 | 74.56 |
| 93 | 69.39 | 54.59 | 54.14 |
| | 64.65 | 52.93 | 48.92 |
| | 65.73 | 52.57 | 49.97 |
| Average | 66.59 | 53.36 | 51.01 |
| 56 | 62.11 | 46.78 | 41.98 |
| | 59.09 | 45.81 | 40.02 |
| Average | 60.60 | 46.30 | 41.00 |
| 91 | 49.46 | 41.77 | 40.15 |
| | 44.82 | 39.42 | 38.24 |
| | 46.91 | 40.86 | 38.59 |
| Average | 47.06 | 40.68 | 38.99 |
| 92 | 24.56 | 17.02 | 16.83 |
| | 22.44 | 18.29 | 18.26 |
| | 29.78 | 18.50 | 17.49 |
| Average | 25.59 | 17.94 | 17.53 |

The data in Table 29 shows that when the surfactant concentration is less than 100 ppm (formulation 93) the 30 second contact angle is slightly higher, which is worse for wetting. However, a better (lower) contact angle, providing better wetting, was observed for the compositions having a surfactant concentration between about 100 ppm and about 200 ppm (formulations 56 and 91), but no significant difference was observed between them. It was found that when the surfactant concentration is about 2000 ppm (formulation 92) there is a significant reduction in the 30 second contact angle, thereby providing improved wetting.

TABLE 30

Contact Angles Measured for Dynol 980 Polishing Compositions on a 128 mm Type C Sapphire Wafer
Sapphire Wafer, 128 mm, type C

| Time, seconds | 1.00 | 15.00 | 30.00 |
|---|---|---|---|
| Colloidal Silica, TX 15763 | 83.00 | 82.42 | 82.64 |
| | 95.00 | 80.57 | 79.88 |
| Average | 89.00 | 81.50 | 81.26 |
| 93 | 54.17 | 44.84 | 43.66 |
| | 56.00 | 48.07 | 44.83 |
| | 57.80 | 46.08 | 44.29 |
| Average | 55.99 | 46.33 | 44.26 |
| 56 | 59.85 | 47.56 | 43.68 |
| Average | 59.85 | 47.56 | 43.68 |
| 91 | 50.07 | 39.81 | 40.73 |
| | 34.60 | 29.52 | 28.18 |
| | 39.57 | 29.13 | 29.13 |
| | 40.80 | 34.39 | 33.32 |
| Average | 41.26 | 33.21 | 32.84 |
| 92 | 21.88 | 18.61 | 18.25 |
| | 26.02 | 19.78 | 20.18 |
| | 25.49 | 18.57 | 19.12 |
| Average | 24.46 | 18.99 | 19.18 |

The data in Table 30 showed no significant difference in the 30 second contact angle of the polishing compositions having a surfactant concentration between about 50 ppm and about 100 ppm (formulations 56 and 93). The contact angle was better (lower) at a surfactant concentration of about 200 ppm (formulation 91), but again when the surfactant concentration is increased to about 2000 ppm (formulation 92) a significant improvement was observed.

Varying concentrations of Dynol 980 were studied in formulations with TX15717 colloidal silica as shown in Table 31. The results of testing on different types of sapphire wafers are shown in Tables 32 and 33.

TABLE 31

Dynol 980 and TX15717 Formulations Tested

| Component | 94 | 95 | 96 | 51 |
|---|---|---|---|---|
| Dynol 980, 30-50% | 0.0063 | 0.0360 | 0.0530 | 0.0129 |
| Colloidal silica, Nalco TX15717, 30-60%, pH = 2.5 | 49.9937 | 49.9640 | 49.9470 | 49.9871 |
| Colloidal silica, Nalco 2325, 40-50%, pH = 9.5 | | | | |
| Colloidal silica, TX15763, 30-50%, pH = 2.97 | | | | |
| Total | 50.0000 | 50.0000 | 50.0000 | 50.0000 |
| Surfactant Total, ppm appearance | 50 | 288 ppt | 424 ppt | 103 |

The solutions using colloidal silica TX15717 having greater than about 100 ppm surfactant precipitated and could not be studied for contact angles. Thus, only formulations 51 and 94 are represented in the data in Tables 32 and 33. Further, TX15717 colloidal silica was not tested the extended surfactant (X-AES) or linear alcohol ethoxylate (LAE 24-7).

TABLE 32

Contact Angles Measured for Dynol 980 Polishing
Compositions on a 60 mm Type A Sapphire Wafer
Sapphire Wafer, 60 mm, type A

| Time, seconds | 1 | 15 | 30 |
|---|---|---|---|
| Colloidal Silica, TX 15717 | 87.23 | 87.65 | 85.70 |
|  | 89.98 | 92.15 | 89.54 |
| Average | 88.61 | 89.90 | 87.62 |
| 94 | 79.19 | 68.30 | 68.72 |
|  | 75.72 | 70.40 | 68.95 |
|  | 77.01 | 68.81 | 69.00 |
| Average | 77.31 | 69.17 | 68.89 |
| 51 | 79.9 | 61.5 | 59.89 |
|  | 65.69 | 56 | 55.83 |
| Average | 72.795 | 58.75 | 57.86 |

Formulation 51, having a surfactant concentration of about 100 ppm provided slightly better performance (lower contact angle) than the Formulation 94 having a surfactant concentration of about 50 ppm in the TX 15717 colloidal silica. However, the contact angle was not as low as general found in the test formulations of Tables 25 and 28.

TABLE 33

Contact Angles Measured for Dynol 980 Polishing
Compositions on a 128 mm Type C Sapphire Wafer
Sapphire Wafer, 128 mm, type C

| Time, seconds | 1 | 15 | 30 |
|---|---|---|---|
| Colloidal Silica, TX 15717 | 70.46 | 68.95 | 66.75 |
| Average | 70.46 | 68.95 | 66.75 |
| 94 | 76.78 | 62.74 | 60.86 |
|  | 72.22 | 61.12 | 61.90 |
|  | 74.12 | 60.96 | 57.21 |
| Average | 74.37 | 61.61 | 59.99 |
| 51 | 76.33 | 70.95 | 66.88 |
| Average | 76.33 | 70.95 | 66.88 |

On the 128 mm, Type C Sapphire wafer, Formulation 94, having a surfactant concentration of about 50 ppm provided slightly better performance (lower contact angle) than the Formulation 51 having a surfactant concentration of about 100 ppm in the TX 15717 colloidal silica. However, here again, the contact angle was not as low as general found in the test formulations of Tables 25 and 28.

Varying concentrations of LAE 24-7 were studied in different colloidal silica. Test formulations using Nalco 2325 colloidal silica are shown in Table 34. The results of testing on different types of sapphire wafers are shown in Tables 35 and 36.

TABLE 34

LAE 24-7 and Nalco 2325 Formulations Tested

| Component | 97 | 98 | 99 | 6 |
|---|---|---|---|---|
| LAE 24-7 | 0.0236 | 0.0118 | 0.0029 | 0.0051 |
| Colloidal silica, Nalco 2325, 40-50%, pH = 9.5 | 49.9764 | 49.9882 | 49.9971 | 49.9949 |
| Colloidal silica, TX15763, 30-50%, pH = 2.97 |  |  |  |  |
| Total | 50.0000 | 50.0000 | 50.0000 | 50.0000 |
| Surfactant Total, ppm | 472 | 236 | 58 | 102 |
| appearance | thickened |  |  |  |

TABLE 35

Contact Angles Measured for LAE 24-7 Polishing
Compositions on a 60 mm Type A Sapphire Wafer
Sapphire Wafer, 60 mm, type A

| Time, seconds | 1 | 15 | 30 |
|---|---|---|---|
| Colloidal Silica, Nalco 2325 | 91.65 | 89.68 | 91.47 |
|  | 93.19 | 91.16 | 90.32 |
| Average | 92.42 | 90.42 | 90.90 |
| 97 | thickened - could not run | | |
| 98 | 69.69 | 47.64 | 46.67 |
|  | 70.93 | 46.24 | 46.29 |
| Average | 70.31 | 46.94 | 46.48 |
| 99 | 72.53 | 61.71 | 57.19 |
|  | 77.77 | 61.11 | 57.39 |
| Average | 75.15 | 61.41 | 57.29 |
| 6 | 70.83 | 62.82 | 58.71 |
| Average | 70.83 | 62.82 | 58.71 |

The data showed that about 200 ppm surfactant (formulation 98) resulted in a lower contact angle (better) at 30 second and no significant difference was observed between about 50 ppm (formulation 99) and about 100 ppm (formulation 6) surfactant.

TABLE 36

Contact Angles Measured for LAE 24-7 Polishing
Compositions on a 128 mm Type C Sapphire Wafer
Sapphire Wafer, 128 mm, type C

| Time, seconds | 1 | 15 | 30 |
|---|---|---|---|
| Colloidal Silica, Nalco 2325 | 58.71 | 51.16 | 50.33 |
| Average | 58.71 | 51.16 | 50.33 |
| 97 | thickened - could not run | | |
| 98 | 61.76 | 46.03 | 46.21 |
|  | 68.49 | 44.72 | 44.24 |
| Average | 65.13 | 45.38 | 45.23 |
| 99 | 61.64 | 52.08 | 51.42 |
|  | 64.01 | 50.26 | 48.86 |
| Average | 62.83 | 51.17 | 50.14 |
| 6 | 65.01 | 55.48 | 55.27 |
|  | 67.58 | 59.49 | 58.53 |
| Average | 66.3 | 57.49 | 56.9 |

The data in Table 36 showed that about 200 ppm surfactant (formulation 98) resulted in a lower contact angle (better) at 30 second; and again no significant difference was observed between about 50 ppm (formulation 99) and about 100 ppm (formulation 6) surfactant was observed.

Varying concentrations of LAE 24-7 were studied in formulations with TX15763 colloidal silica as shown in Table 37. The results of testing on different types of sapphire wafers are shown in Tables 38 and 39.

TABLE 37

LAE 24-7 and TX15763 Formulations Tested

| Component | 100 | 101 | 102 | 103 | 81 |
|---|---|---|---|---|---|
| LAE 24-7 | 0.1013 | 0.0119 | 0.0239 | 0.0029 | 0.005 |
| Colloidal silica, Nalco 2325, 40-50%, pH = 9.5 | | | | | |
| Colloidal silica, TX15763, 30-50%, pH = 2.97 | 49.8987 | 49.9881 | 49.9761 | 49.9971 | 49.9950 |
| Total | 50.0000 | 50.0000 | 50.0000 | 50.0000 | 50.0000 |
| Surfactant Total, ppm | 2026 | 238 | 478 | 60 | 100 |

TABLE 38

Contact Angles Measured for LAE 24-7 Polishing Compositions on a 60 mm Type A Sapphire Wafer
Sapphire Wafer, 60 mm, type A

| Time, seconds | 1 | 15 | 30 |
|---|---|---|---|
| Colloidal Silica, TX 15763 | 87.45 | 78.62 | 75.49 |
| | 79.09 | 74.79 | 73.63 |
| Average | 83.27 | 76.71 | 74.56 |
| 100 | 39.61 | 23.56 | 23.19 |
| | 25.74 | 20.17 | 20.26 |
| Average | 32.68 | 21.87 | 21.73 |
| 102 | 50.71 | 34.35 | 34.11 |
| | 51.19 | 26.09 | 25.55 |
| Average | 50.95 | 30.22 | 29.83 |
| 101 | 48.59 | 29.36 | 28.41 |
| | 49.15 | 26.87 | 27.53 |
| Average | 48.87 | 28.12 | 27.97 |
| 103 | 82.35 | 80.10 | 79.02 |
| | 86.82 | 85.17 | 83.95 |
| Average | 84.59 | 82.64 | 81.49 |
| 81 | 66.90 | 40.84 | 34.98 |
| | 71.03 | 44.43 | 37.87 |
| Average | 68.97 | 42.64 | 36.43 |

Again, about 60 ppm surfactant (formulation 103) shows an increase in the contact angle (worse wetting) while about 100 ppm (formulation 81) and about 200 ppm (formulation 101) show lower contact angle (better wetting) and no significant difference between each other. Above about 450 ppm (formulation 102) a reduced contact angle is observed indicative of better wetting, with the formulation of about 2000 ppm (formulation) providing the best (lowest) contact angle.

TABLE 39

Contact Angles Measured for LAE 24-7 Polishing Compositions on a 60 mm Type C Sapphire Wafer
Sapphire Wafer, 60 mm, type C

| Time, seconds | 1 | 15 | 30 |
|---|---|---|---|
| Colloidal Silica, TX 15763 | 83.00 | 82.42 | 82.64 |
| | 95.00 | 80.57 | 79.88 |

TABLE 39-continued

Contact Angles Measured for LAE 24-7 Polishing Compositions on a 60 mm Type C Sapphire Wafer
Sapphire Wafer, 60 mm, type C

| Time, seconds | 1 | 15 | 30 |
|---|---|---|---|
| Average | 89.00 | 81.50 | 81.26 |
| 100 | 32.45 | 19.37 | 17.32 |
| | 32.96 | 19.53 | 19.21 |
| Average | 32.705 | 19.45 | 18.265 |
| 102 | 40.85 | 20.52 | 18.19 |
| | 39.96 | 22.63 | 22.33 |
| Average | 40.405 | 21.575 | 20.26 |
| 101 | 49.64 | 25.33 | 24.53 |
| | 43.36 | 23.87 | 22.28 |
| Average | 46.5 | 24.6 | 23.405 |
| 103 | 79.03 | 68.49 | 64.93 |
| | 79.36 | 68.81 | 65.41 |
| Average | 79.195 | 68.65 | 65.17 |
| 81 | 73.25 | 56.85 | 49.47 |
| Average | 73.25 | 56.85 | 49.47 |

The data in Table 39 follows the same trend. At about 50 ppm (formulation 103) the 30 second contact angle is higher. At about 100 ppm (formulation 82), the contact angle is decreased. At about 200 ppm (formulation 101) and about 450 ppm (formulation 102) there is a small decrease in the 30 second contact angle with increasing surfactant concentration. At about 2000 ppm, the contact angle is the lowest demonstrating a significant effect on reducing the contact angle above a concentration of about 1000 ppm.

Varying concentrations of X-AES were studied in formulations with TX15763 colloidal silica as shown in Table 40. The results of testing on different types of sapphire wafers are shown in Tables 41 and 42.

TABLE 40

X-AES and TX15763 Formulations Tested

| Component | 104 | 105 | 106 | 107 | 55 |
|---|---|---|---|---|---|
| X-AES, 24.5% | 0.2270 | 0.1135 | 0.0564 | 0.0110 | 0.0211 |
| Colloidal silica, Nalco 2325, 40-50%, pH = 9.5 | | | | | |
| Colloidal silica, TX15763, 30-50%, pH = 2.97 | 49.7730 | 49.8865 | 49.9436 | 49.9890 | 49.9789 |
| Total | 50.0000 | 50.0000 | 50.0000 | 50.0000 | 50.0000 |
| Surfactant Total, ppm | 1067 | 533 | 265 | 52 | 99 |

TABLE 41

Contact Angles Measured for X-AES Polishing Compositions on a 60 mm Type A Sapphire Wafer
Sapphire Wafer, 60 mm, type A

| Time, seconds | 1 | 15 | 30 |
|---|---|---|---|
| Colloidal Silica, TX 15763 | 87.45 | 78.62 | 75.49 |
| | 79.09 | 74.79 | 73.63 |

TABLE 41-continued

Contact Angles Measured for X-AES Polishing
Compositions on a 60 mm Type A Sapphire Wafer
Sapphire Wafer, 60 mm, type A

| Time, seconds | 1 | 15 | 30 |
|---|---|---|---|
| Average | 83.27 | 76.71 | 74.56 |
| 104 | 60.27 | 39.73 | 33.99 |
|  | 58.01 | 40.15 | 35.51 |
|  | 59.14 | 39.94 | 34.75 |
| 105 | 66.04 | 59.16 | 51.28 |
|  | 67.23 | 55.38 | 49.5 |
| Average | 66.64 | 57.27 | 50.39 |
| 105 | 60.3 | 57.57 | 56.44 |
|  | 67.04 | 65.44 | 62.24 |
| Average | 63.67 | 61.505 | 59.34 |
| 107 | 76.75 | 74.2 | 73.49 |
| Average | 76.75 | 74.2 | 73.49 |
| 55 | 66.59 | 54.03 | 47.29 |
|  | 67.61 | 53.94 | 51.06 |
| Average | 67.1 | 53.99 | 49.18 |

Formulation 107, having a surfactant concentration of about 50 ppm had a higher contact angle while the formulations having about 100 ppm (formulation 55) and 500 ppm (formulation 105) surfactant had a lower contact angle (indicating better wetting) but no significant difference between them. Again, the formulation having at least about 1000 ppm (formulation 104) surfactant had the most significant decrease in the 30 second contact angle indicative of better wetting.

TABLE 42

Contact Angles Measured for X-AES Polishing
Compositions on a 60 mm Type C Sapphire Wafer
Sapphire Wafer, 60 mm, type C

| Time, seconds | 1 | 15 | 30 |
|---|---|---|---|
| Colloidal Silica, TX 15763 | 83.00 | 82.42 | 82.64 |
|  | 95.00 | 80.57 | 79.88 |
| Average | 89.00 | 81.50 | 81.26 |
| 104 | 64.56 | 41.35 | 35.92 |
|  | 57.62 | 40.00 | 34.88 |
|  | 61.09 | 40.675 | 35.4 |
| 105 | 65.75 | 55.38 | 51.38 |
|  | 65.51 | 54.79 | 50.23 |
| Average | 65.63 | 55.09 | 50.81 |
| 105 | 66.03 | 58.98 | 53.65 |
|  | 63.11 | 60.74 | 54.86 |
| Average | 64.57 | 59.86 | 54.255 |
| 107 | 59.52 | 58.13 | 56.77 |
|  | 52.91 | 50.51 | 50.74 |
| Average | 56.215 | 54.32 | 53.755 |
| 55 | 63.44 | 54.24 | 52.95 |
| Average | 63.44 | 54.24 | 52.95 |

The data in Table 42 showed no significant difference in the 30 second contact angles at surfactant concentrations between about 50 ppm and about 500 ppm (formulations 105, 106, 107, and 55). However, at a concentration of greater than about 1000 ppm surfactant, the contact angle was found to decrease by at least about 15 degrees.

Varying concentrations of X-AES were studied in formulations with TX2325 colloidal silica as shown in Table 43. The results of testing on different types of sapphire wafers are shown in Tables 44 and 45.

TABLE 43

X-AES and Nalco 2325 Formulations Tested

| Component | 108 | 109 | 110 | 111 | 18 |
|---|---|---|---|---|---|
| X-AES, 24.5% | 0.2157 | 0.1078 | 0.0538 | 0.0108 | 0.0225 |
| Colloidal silica, Nalco 2325, 40-50%, pH = 9.5 | 49.7843 | 49.8922 | 49.9462 | 49.9892 | 49.9775 |
| Colloidal silica, TX15763, 30-50%, pH = 2.97 |  |  |  |  |  |
| Total | 50.0000 | 50.0000 | 50.0000 | 50.0000 | 50.0000 |
| Surfactant Total, ppm | 1014 | 507 | 253 | 51 | 106 |

TABLE 44

Contact Angles Measured for X-AES Polishing
Compositions on a 128 mm Type A Sapphire Wafer
Sapphire Wafer, 128 mm, type A

| Time, seconds | 1 | 15 | 30 |
|---|---|---|---|
| Colloidal Silica, Nalco 2325 | 91.65 | 89.68 | 91.47 |
| Average | 93.19 | 91.16 | 90.32 |
|  | 92.42 | 90.42 | 90.90 |
| 108 | 69.81 | 62.35 | 56.87 |
|  | 72.71 | 57.82 | 54.91 |
| Average | 71.26 | 60.085 | 55.89 |
| 109 | 67.22 | 54.75 | 51.34 |
|  | 72.43 | 63.04 | 58.25 |
| Average | 69.83 | 58.90 | 54.80 |
| 110 | 57.04 | 53.14 | 51.98 |
|  | 60.08 | 56.84 | 58.15 |
| Average | 58.56 | 54.99 | 55.065 |
| 111 | 74.65 | 74.8 | 72 |
|  | 84.04 | 74.76 | 72.96 |
| Average | 79.345 | 74.78 | 72.48 |
| 18 | 65.36 | 49.05 | 46.72 |
|  | 66.22 | 49.8 | 46.46 |
| Average | 65.79 | 49.43 | 46.59 |

Table 44 shows no significant difference in the 30 second contact angle between surfactant concentration of about 100 ppm and about 1000 ppm surfactant (formulations 108, 109, 110, and 18); however, a surfactant concentration of about 50 ppm (formulation 111) showed a significant increase in contact angle.

TABLE 45

Contact Angles Measured for X-AES Polishing Compositions on a 128 mm Type C Sapphire Wafer Sapphire Wafer, 128 mm, type C

| Time, seconds | 1 | 15 | 30 |
|---|---|---|---|
| Colloidal Silica, Nalco 2325 | 58.71 | 51.16 | 50.33 |
| Average | 58.71 | 51.16 | 50.33 |
| 108 | 59.91 | 50.97 | 56.33 |
|  | 58.18 | 48.95 | 46.69 |
| Average | 59.05 | 49.96 | 51.51 |
| 109 | 64.55 | 55.06 | 52.29 |
|  | 62.08 | 53.88 | 52.12 |
| Average | 63.32 | 54.47 | 52.21 |
| 110 | 63.85 | 57.28 | 54.99 |
|  | 66.8 | 61.42 | 60.4 |
| Average | 65.325 | 59.35 | 57.695 |
| 111 | 63.37 | 60.7 | 57.74 |
|  | 73.15 | 66.77 | 64.62 |
| Average | 68.26 | 63.735 | 61.18 |
| 18 | 63.96 | 49.9 | 47.05 |
|  | 61.78 | 49.92 | 47.05 |
| Average | 62.87 | 48.91 | 47.05 |

Again, no significant difference was observed in the 30 second contact angle between about 100 ppm and about 1000 ppm surfactant (formulations 108, 109, 110, and 18); however, a concentration of about 50 ppm surfactant (formulation 111) provided an increase in contact angle.

The data in Example 6 shows that at a surfactant concentration of about 50 ppm the compositions will generally provide poorer wetting on sapphire surfaces. Increasing the surfactant concentration to between about 100 ppm and about 1000 ppm surfactant provides a lower contact angle, but not much variation in the contact between the different concentrations. Increasing the surfactant concentration to about 1000 ppm or greater tended to provide the lowest contact angle. Thus, compositions having greater than 100 ppm can be suitable and equal to or greater than about 1000 ppm surfactant are most preferred.

Example 7

The relationship between surface tension and contact angle was also studied. The data confirmed that compositions having lower surface tension also had low contact angles. Different surfactants were tested in different types of colloidal silica. The surface tension was measured at 30 seconds and at 60 seconds in dynes/cm at 20° C. The contact angle of the surfactant compositions was also measured at 30 seconds on two types of sapphire wafers, Type A and Type C. The data from these tests is produced below in Tables 46-48.

TABLE 46

Surface Tension and Contact Angle Measurements of Colloidal Silica Nalco 2325 with Differing Surfactants

| Surfactant (about 100 ppm) | Surface tension ~30/60 seconds | 30 second Contact Angle Type C Wafer | Type A Wafer |
|---|---|---|---|
| #57 (Dynol 980) | 30.3/28.4 | 44.05 | 34.87 |
| #49 (Dynol 800) | 31.2/28.4 | 44.28 | 38.66 |
| #41 (X-AES) | 38.4/35.5 | 47.05 | 46.59 |
| #155 (Tomadol 25-3) | 42.1/37.5 | 49.14 | 44.14 |
| #150 (50:50 Tomadol 25-3 + Steposol 10METU) | 42.7/39.2 | 53.09 | 46.56 |
| #69 (Alfoterra 123-8S) | 42/34.6 | 49.94 | 47.92 |
| #149 (50:50 Tomadol 25-3 + Pluronic L-61) | 44.5/41.1 | 53.96 | 51.98 |
| #154 (Marlowet 4539) | 44.5/43.8 | 49.17 | 35.25 |
| #148 (3:2 SLF180 + Dehypon Wet) | 46.4/43.3 | 45.92 | 49.20 |
| #141 (Tomadol 23-5) | 47.3/43.1 | 56.77 | 57.50 |
| #142 (Dehypon Wet) | 48.3/45.5 | 54.41 | 59.55 |
| #151 (50:50 Dehypon Wet + Steposol Met 10U) | 48.5/47.3 | 49.85 | 52.05 |
| #146 (miranol) | 53.5/51.3 | 64.71 | 64.46 |
| #152 (50:50 dedypon wet + Pluronic 10R5) | 53.9/51.8 | 53.58 | 60.57 |
| #153 (1:1:1 Wet + Tomamine E-C-15 + Pluroic 10R5) | 55.7/53.5 | 51.66 | 67.88 |
| #147 (50:50 Dehypon Wet + Pluronic 25R2) | 55.9/52.9 | 56.38 | 38.40 |
| #29 (LAE 24-7) | 56.7/49.9 | 57.87 | 58.71 |
| #140, Tegopren 5840 | 66.1/65.8 | 58.63 | 42.56 |
| #143 (50:50 pluronic 25R2 + DDAO) | 67.1/66.4 | 64.08 | 51.36 |

TABLE 47

Surface Tension and Contact Angle Measurements of Colloidal Silica TX-15763 with Differing Surfactants

| Surfactant (about 100 ppm) | Surface tension ~30/60 seconds | 30 second Contact Angle Type C Wafer | Type A Wafer |
|---|---|---|---|
| #80 (Dynol 980) | 31.9/31.1 | 43.68 | 41.00 |
| #78 (Dynol 800) | 34.2/33 | 47.60 | 46.39 |
| #77 (Alfoterra 123-8S) | 34.7/33.5 | 51.78 | 48.62 |
| #79 (X-AES) | 35.9/34.4 | 52.95 | 49.18 |
| #81 (LAE24-7) | 36.7/34.5 | 49.47 | 36.43 |
| #161 (FDRA) | 46.1/44.1 | 51.34 | 52.43 |
| #139 (marlowet 4539) | 50.8/50.6 | 64.51 | 61.82 |
| #133 (50:50 SLF 180 + Dehypon Wet) | 56.1/54.2 | 60.40 | 58.53 |
| #127 (Dehypon Wet) | 58.2/55.9 | 67.48 | 80.64 |
| #134 (50:50 Tomadol 25-3 + pluronic L-61) | 58.4/55.8 | 58.31 | 70.58 |
| #131 (Miranol) | 58.4/56.6 | 67.85 | 49.57 |
| #137 (50:50 Dehypon Wet + Pluronic 10R5) | 60.4/58.2 | 66.96 | 54.00 |
| #139 ½ (Tomadol 25-3) | 60.8/58.7 | 64.89 | 59.29 |
| #138 (1:1:1 Wet + Tomamine E-C-15 + Pluroic 10R5) | 61.5/59.6 | 69.79 | 68.00 |
| #132 (50:50 Dehypon Wet + Pluronic 25R2) | 62.3/60 | 68.87 | 64.04 |
| #126 (Tomadol 23-5) | 63.8/62.1 | 58.86 | 63.68 |
| #156 (Kaneka Surfactin) | 66.2/66.3 | 60.89 | 60.62 |
| #135 (50:50 Tomadol 25-3 + Steposol 10METU) | 67.7/67.5 | 60.94 | 69.56 |
| #159 (Finito) | 68.3/66.3 | 60.06 | 63.17 |
| #125 (Tegopren 5840) | 68/67.7 | 63.17 | 64.54 |

TABLE 48

Surface Tension and Contact Angle Measurements of Colloidal Silica TX-15717 with Differing Surfactants

| Surfactant (about 100 ppm) | Surface tension ~30/60 seconds | 30 second Contact Angle | |
|---|---|---|---|
| | | Type C Wafer | Type A Wafer |
| #75 (Dynol 980) | 33.3/32.5 | 66.88 | 57.86 |
| #73 (Dynol 800) | 36.4/35.2 | 63.42 | 63.91 |
| #72 (Alfoterra 123-8S) | 39.7/37.5 | 57.64 | 57.71 |
| #74 (X-AES) | 44.9/40.9 | 66.24 | 69.71 |
| #158 (Finito) | 47.6/32.4 | 58.56 | 58.73 |
| #76 (LAE 24-7) | 54.5/51.9 | 83.68 | 69.38 |
| #157 (Kaneka Surfactin) | 68.6/68.8 | 75.04 | 62.91 |

The critical surface tension of sapphire is between about 45 and about 47 dynes/cm at 20° C. This is the surface tension where substantially all of the sapphire surface can be completely wet by a liquid. Thus, in order to completely wet the surface of a sapphire surface, the surface tension of the liquid composition should be below about 45 dynes/cm at 20° C. Thus, polishing compositions were evaluated for their surface tension and their contact angles.

The inventions being thus described, it will be obvious that the same may be varied in many ways. Such variations are not to be regarded as a departure from the spirit and scope of the inventions and all such modifications are intended to be included within the scope of the following claims.

The above specification provides a description of the manufacture and use of the disclosed compositions and methods. Since many embodiments can be made without departing from the spirit and scope of the invention, the invention resides in the claims.

What is claimed is:

1. A method of polishing a sapphire surface, comprising:
abrading a sapphire surface with a rotating polishing pad and a polishing composition,
wherein the polishing composition comprises an effective amount of colloidal silica and a surfactant, the colloidal silica has a particle size distribution of from about 5 nm to about 120 nm; the ratio of the standard deviation of the particle size of the colloidal silica (CT) to the mean particle size of the colloidal silica (r) is from about 0.30 to about 0.90; and the surfactant is one represented by the following formula I or II,

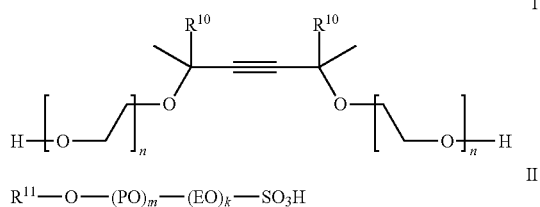

$$R^{11}-O-(PO)_m-(EO)_k-SO_3H \quad II$$

wherein $R^{10}$ is a $C_3$-$C_{20}$ alkyl or alkenyl group, $R^{11}$ is a $C_4$-$C_{20}$ alkyl, n, m, and k are independently integers of 1 to 20, and
wherein the surfactant has a concentration of between about 1,000 ppm and about 2,000 ppm in the polishing composition.

2. The method of claim 1, wherein the surfactant is a gemini surfactant represented by the following formula,

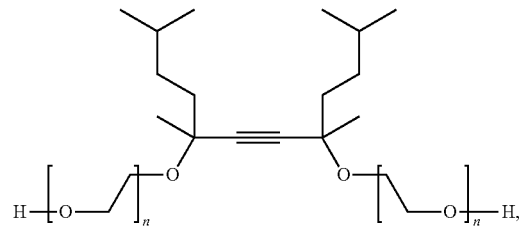

where n is an integer of 1 to 10.

3. The method of claim 1, wherein the surfactant is an extended surfactant represented by the following formula, $R^{11}-(PO)_{16}$-$(EO)_2-SO_3H$, where $R^{11}$ is a $C_{12}$-$C_{14}$ alkyl.

4. The method of claim 1, wherein the polishing composition further comprises a salt.

5. The method of claim 1, wherein the polishing composition further comprises a potassium sulfate.

6. The method of claim 1, wherein the polishing composition has a contact angle of less than about 50 degrees on the sapphire surface after about 30 seconds.

7. The method of claim 1, wherein the polishing composition has a contact angle less than about 30 degrees on the sapphire surface after about 30 seconds.

8. The method of claim 1, wherein the polishing composition contains about 2,000 ppm of the surfactant.

9. The method of claim 1, wherein the polishing composition contains about 1 wt-% to about 50 wt-% of the colloidal silica, and wherein the colloidal silica has a particle size distribution of from about 5 nm to about 50 nm, or from about 50 nm to about 120 nm.

10. The method of claim 5, wherein potassium sulfate is from about 100 ppm to about 3000 ppm in the polishing composition.

11. The method of claim 1, wherein the ratio of the standard deviation of the particle size of the colloidal silica (CT), to the mean particle size of the colloidal silica (r), is from about 0.50 to about 0.90.

12. The method of claim 1, wherein the polishing composition further comprises an alkaline substance, inorganic polishing particles, a water-soluble alcohol, a chelating agent, a buffering agent, or combination thereof.

13. The method of claim 1, wherein the pH of the polishing composition is from about 2.0 to about 10.5, about 9.5, or about 3.0.

14. The method of claim 1, wherein the polishing pad is applied to the sapphire surface with a downforce of about 5 psi to about 25 psi and the polishing pad is rotating at a rate of about 40 rpm to about 120 rpm.

15. The method of claim 1, wherein the polishing pad comprises a polyurethane impregnated polyester material.

16. The method of claim 1, wherein the polishing pad has a compressibility of about 1% to about 40%.

17. The method of claim 1, wherein the polishing pad has a Shore D hardness of about 50 to about 60.

18. The method of claim 1, wherein the sapphire surface is a sapphire C-plane surface or a sapphire R-plane surface.

* * * * *